(12) United States Patent
Onsen

(10) Patent No.: US 6,473,811 B1
(45) Date of Patent: Oct. 29, 2002

(54) METHOD AND APPARATUS FOR DISPLAYING A CONNECTION STATUS OF A DEVICE BASED ON CONNECTION INFORMATION

(75) Inventor: Takahiro Onsen, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/266,262

(22) Filed: Mar. 11, 1999

(30) Foreign Application Priority Data

Mar. 13, 1998 (JP) .......................................... 10-082930

(51) Int. Cl.$^7$ ........................... G06F 13/14; G06F 13/20
(52) U.S. Cl. ............................. 710/15; 710/17; 710/19; 709/223; 709/224
(58) Field of Search .............................. 710/15, 17, 19; 709/223, 224

(56) References Cited

U.S. PATENT DOCUMENTS

| | | | |
|---|---|---|---|
| 5,500,934 A | * 3/1996 | Austin et al. | ................ 395/755 |
| 5,995,916 A | * 11/1999 | Nixon et al. | ................ 702/182 |
| 6,055,163 A | * 4/2000 | Wagner et al. | ................ 363/37 |
| 6,246,485 B1 | * 6/2001 | Brown et al. | ............... 358/1.13 |
| 6,332,159 B1 | * 12/2001 | Hatae et al. | ................ 709/220 |

* cited by examiner

*Primary Examiner*—Jeffrey Gaffin
*Assistant Examiner*—Rehana Perveen
(74) *Attorney, Agent, or Firm*—Fitzpatrick, Cella, Harper & Scinto

(57) ABSTRACT

An information processing apparatus to which a plurality of devices are connected comprises: an obtaining means for obtaining system setting information provided by the operating system; and a displaying means for recognizing the connection status of the plurality of devices based on the system setting information obtained by the obtaining means, and displaying the connection status of the plurality of devices.

Also, an information processing apparatus to which a plurality of devices are connected comprises: an obtaining means for obtaining connection information of the plurality of devices; a comparing means for comparing the length of character strings of connection information for the plurality of devices, based on connection information obtained by the obtaining means; and a displaying means for displaying the connection status of the plurality of devices according to the comparison results from the comparing means.

Thus, the object of providing an information processing apparatus, connection status displaying method, information processing system, and storage medium, whereby the connection status of multiple connected devices can be easily confirmed, and the user can immediately grasp where the device to be used is located, can be realized.

45 Claims, 35 Drawing Sheets

FIG. 21

 HOST COMPUTER —2101

 PRINTER: AVAILABLE: WITH COLOR HEAD —2102

 PRINTER: AVAILABLE: WITH B/W HEAD —2103

 PRINTER: AVAILABLE: WITH SCANNER HEAD —2104

 PRINTER: NOT AVAILABLE: WITH UNIDENTIFIED HEAD —2105

 PRINTER: NOT AVAILABLE: WITH COLOR HEAD —2106

 PRINTER: NOT AVAILABLE: WITH B/W HEAD —2107

 PRINTER: NOT AVAILABLE: WITH SCANNER HEAD —2108

 PRINTER: INFORMATION NOT COLLECTABLE (INACCESSIBLE): WITH UNIDENTIFIED HEAD —2109

 PRINTER: INFORMATION NOT COLLECTABLE (INACCESSIBLE): WITH COLOR HEAD —2110

 PRINTER: INFORMATION NOT COLLECTABLE (INACCESSIBLE): WITH B/W HEAD —2111

 PRINTER: INFORMATION NOT COLLECTABLE (INACCESSIBLE): WITH SCANNER HEAD —2112

FIG. 22

 USBPRNx (PRINTER-FRIENDLY NAME / PRINT CARTRIDGE NAME) ⌒2201

 USBPRNx (IS Scan USB / SCANNER) ⌒2202

 USBPRNx (DRIVER UNIDENTIFIED / CARTRIDGE UNIDENTIFIED) ⌒2203

 USBPRNx (LATEST DRIVER INFORMATION / LATEST CARTRIDGE INFORMATION) ⌒2204

 USBPRNx (NO PRINTER DRIVER / PRINT CARTRIDGE NAME) ⌒2205

 USBPRNx (NO SCANNER DRIVER / SCANNER) ⌒2206

 USBPRNx (DRIVER UNIDENTIFIED / CARTRIDGE UNIDENTIFIED) ⌒2207

 USBPRNx (LATEST DRIVER INFORMATION / LATEST CARTRIDGE INFORMATION) ⌒2208

FIG. 23

USB_PRINTER_INFO_1 STRUCTURE

```
typedef struct _USB_PRINTE_INFO_1
    char szName[64];        —2301
    char szPortName[16];    —2302
    char szUsbAddress[256]; —2303
    DWORD dUnitInfo;        —2304
    DWORD dPrinterStatus;   —2305
} USB_PRINTER_INFO_1;
```

METHOD AND APPARATUS FOR DISPLAYING A CONNECTION STATUS OF A DEVICE BASED ON CONNECTION INFORMATION

BACKGROUND OF THE INVENTION

1. Field of the Invention

The present invention relates to a means for displaying the connection status of office automation equipment such as printers and scanners connected to an information processing apparatus.

2. Description of the Related Art

Known arrangements of connecting multiple printer devices and scanner devices to an information processing apparatus such as a host computer or the like and executing printing or reading of documents require that confirmation be made regarding how the devices are connected to the information processing apparatus, in order for the user to set the printing paper or document to be read in the device to be used.

Also, there is the need to confirm which of the ports of the information processing apparatus the device to be used is connected to, in order for the user to correlate device drivers with connected devices by performing operations on the display of the information processing apparatus, for example.

Accordingly, with known arrangements, in the event that scanner devices or the like are connected via a parallel interface such as a Centronics interface wherein one device is connected to one port, the user can easily confirm which device is the device to use and to which of the ports of the information processing apparatus the device to be used is connected to, by displaying port connection information correlating each interface port and the device connected to the port (e.g., a display stating, "Scanner device 'A' is connected to LPT port 1") on the display of the information processing apparatus.

However, in the event that the information processing apparatus has an interface permitting cascade (serial) connections such as USB ports or permitting star connections, with a plurality of scanner devices or the like connected to the interface, known system arrangements do not allow the user to confirm how each device is connected to the information processing apparatus based on the above-described port connection information alone. For example, in an arrangement where the information processing apparatus has one port, and a total of four printer devices or the like are connected in a sequential cascade (i.e., serially), not only can the user not grasp the actual order in which the devices are serially connected to the information processing apparatus, the user cannot immediately determine where the device to be used is, which is problematic.

SUMMARY OF THE INVENTION

It is an object of the present invention to solve the above problems by providing an information processing apparatus, connection status displaying method, information processing system, and storage medium, whereby the connection status of multiple connected devices can be easily confirmed, and the user can immediately grasp where the device to be used is located.

To this end, the information processing apparatus according to the present invention is an information processing apparatus to which a plurality of devices are connected, comprising: an obtaining means for obtaining system setting information provided by the operating system; and a displaying means for recognizing the connection status of the plurality of devices based on the system setting information obtained by the obtaining means, and displaying the connection status of the plurality of devices.

Also, the information processing apparatus according to the present invention is an information processing apparatus to which a plurality of devices are connected, comprising: an obtaining means for obtaining connection information of the plurality of devices; a comparing means for comparing the length of character strings of connection information for the plurality of devices, based on connection information obtained by the obtaining means; and a displaying means for displaying the connection status of the plurality of devices according to the comparison results from the comparing means.

BRIEF DESCRIPTION OF THE DRAWINGS

FIG. 21 is a list of bit-maps displayed on the connection status display area;

FIG. 22 is a list of text displayed on the connection status display area;

FIG. 23 is a detailed diagram showing the structure for saving information;

DESCRIPTION OF THE PREFERRED EMBODIMENTS

Figure 1:
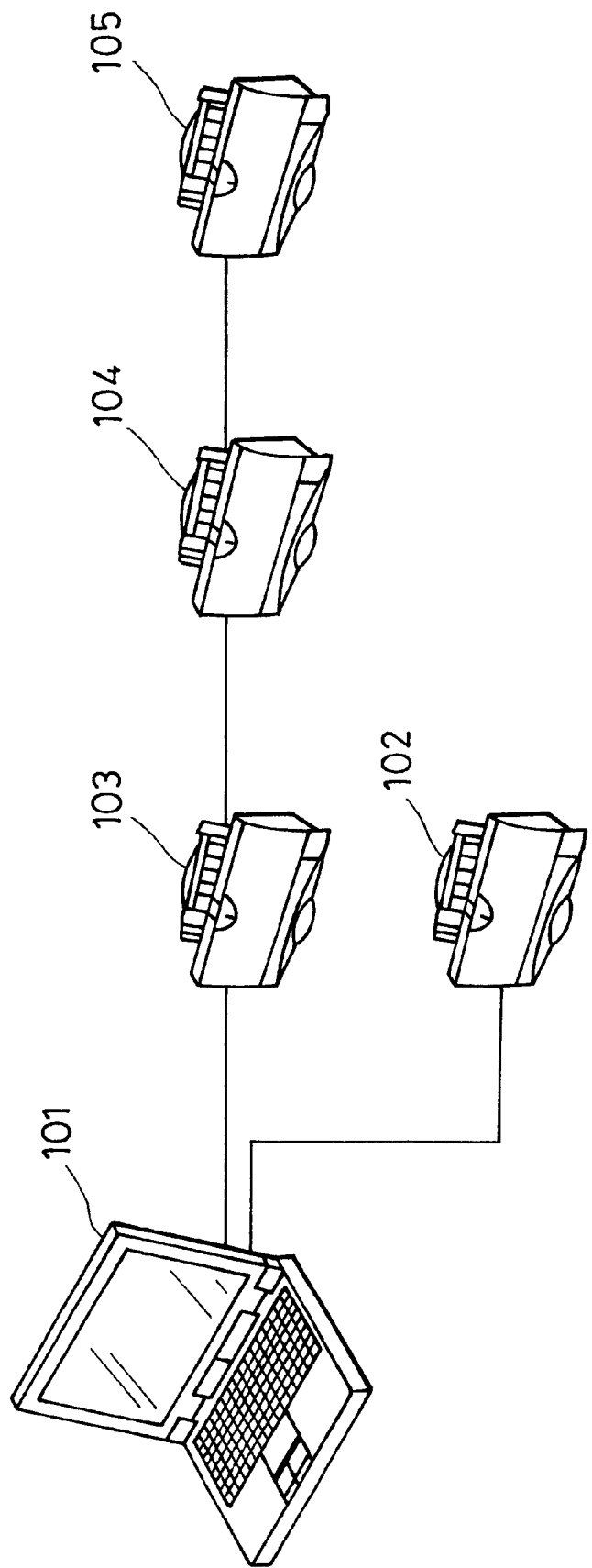
FIG. 1 is an external view of the information processing system according to an embodiment of the present invention.

FIG. 1 is an external view showing the characteristics of an embodiment of an information processing system wherein a plurality of compact and low-priced printer/scanner devices, provided with document printing and document reading capabilities by means of mounting detachable scanner/printer cartridges on serial printers, are connected to a host computer. In the Figure, reference numeral 101 denotes a notebook-type host computer (information processing apparatus), reference numeral 102 denotes a printer/scanner device A, reference numeral 103 denotes a printer/scanner device B, reference numeral 104 denotes a printer/scanner device C, and reference numeral 105 denotes a printer/scanner device D.

The notebook-type host computer 101 has a USB hub with two connections, and the printer/scanner devices 102 through 105 each have a USB hub with one connection.

Each of the devices comprising the system are connected with USB (Universal Serial Bus) cables, and are in cascade (serial) arrangements of: the host computer 101 to the printer/scanner device A 102; and the host computer 101 to the printer/scanner device B 103, the printer/scanner device C 104, and the printer/scanner device D 105.

In the event that the devices are connected as described above, it appears when viewed from the host computer 101 that the printer/scanner device A 102 is connected to the USBPRN01 port, the printer/scanner device B 103 is connected to the USBPRN02 port, the printer/scanner device C 104 is connected to the USBPRN03 port, and the printer/scanner device D 105 is connected to the USBPRN04 port.

While the present embodiment connects the printer/scanner devices in a simple cascade (serial) arrangement, connecting hubs capable of connecting multiple devices allows addition of star connections.

Figure 2:
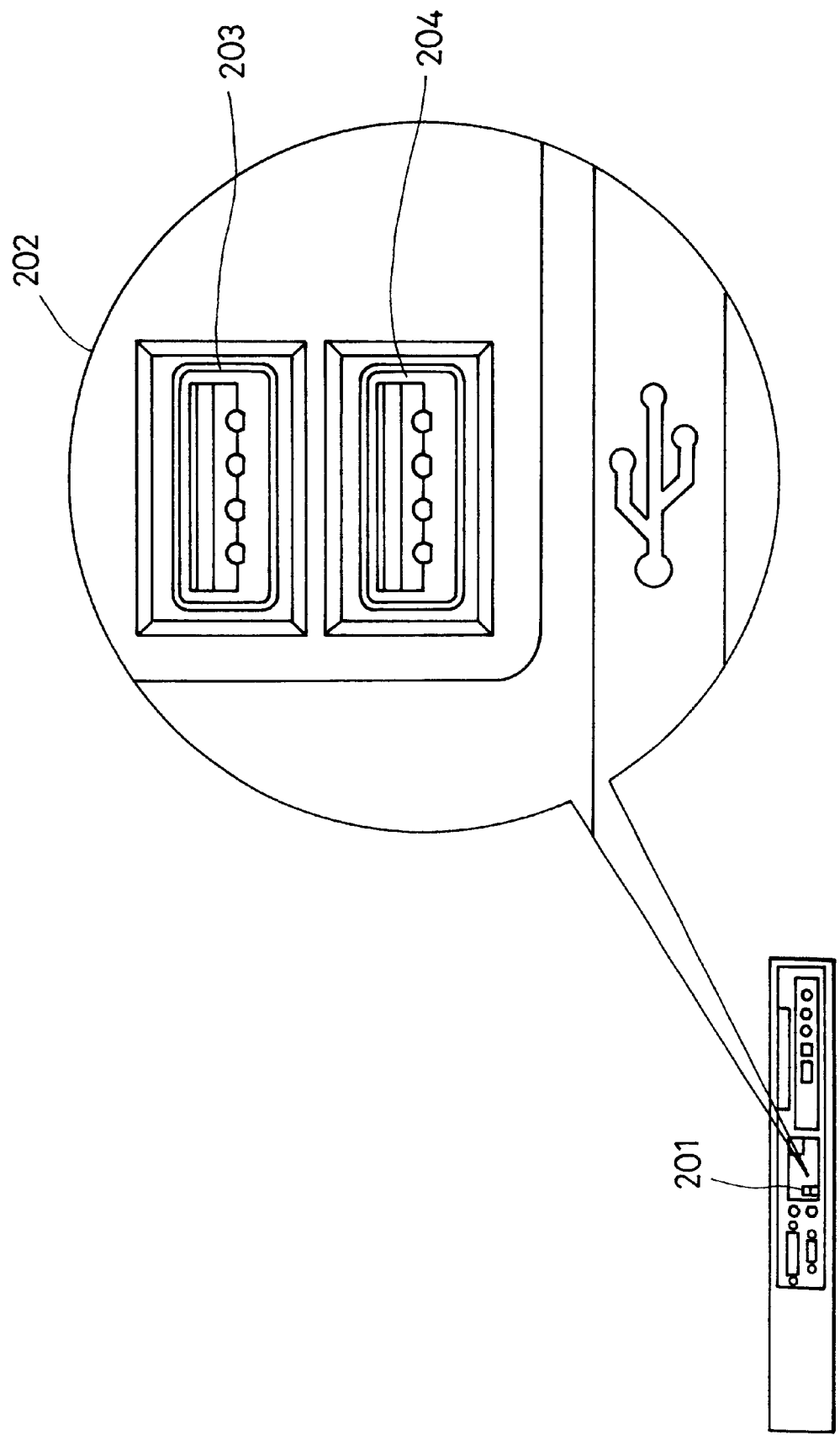
FIG. 2 is a rear view of a notebook-type host computer according to the present embodiment.

FIG. 2 is a rear view of the notebook-type host computer 101 according to the present embodiment, and in the Figure, reference numeral 201 denotes a USB connector portion, with reference numeral 202 being an enlargement of the USB connector portion. Reference numeral 203 denotes a USB connector 1 and reference numeral 204 denotes a USB connector 2, so the host computer has a total of two USB interface connectors.

Figure 3:
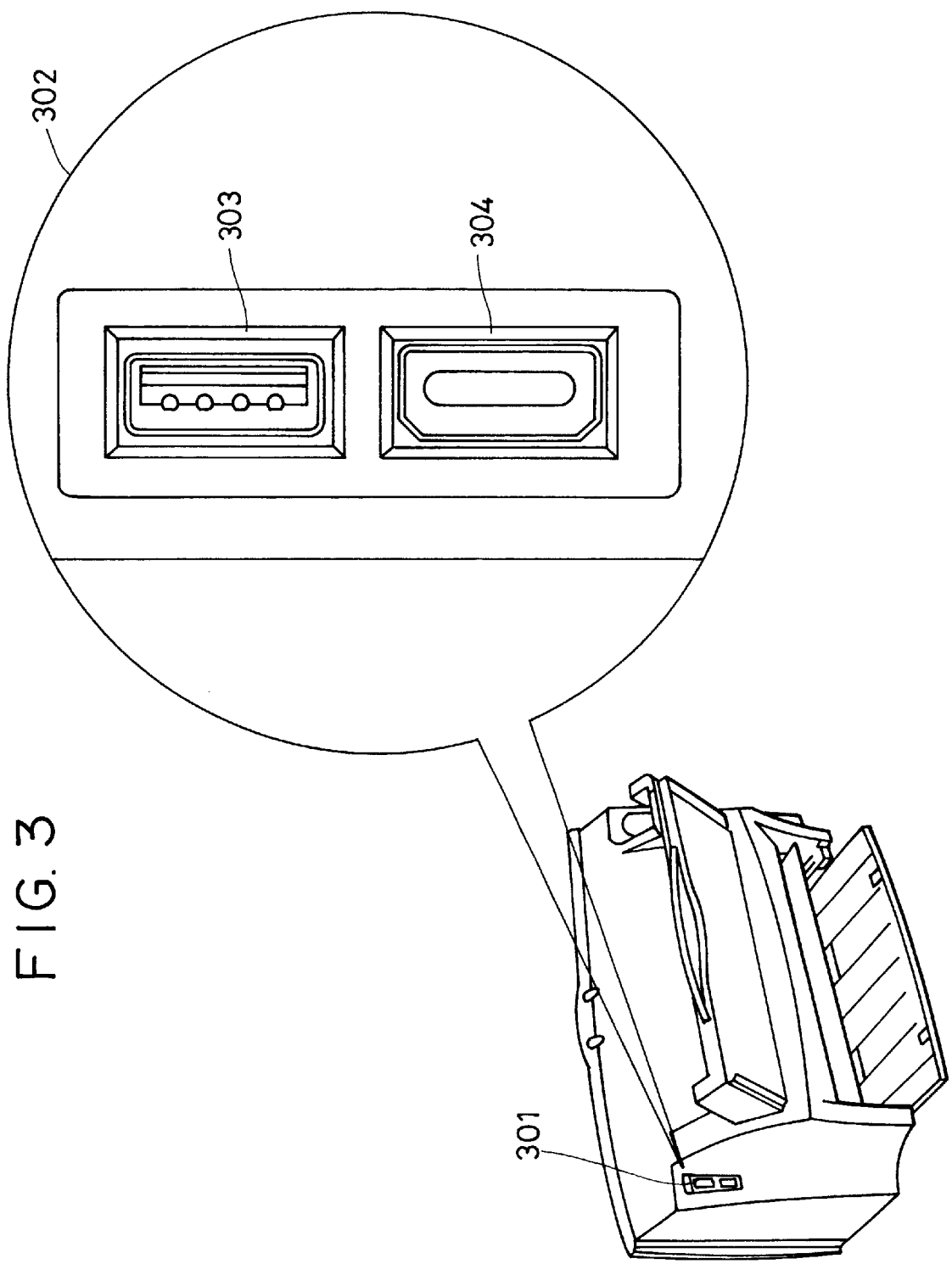
FIG. 3 is a rear view common to the printer/scanner devices according to the present embodiment.

FIG. 3 is a rear view common to the printer/scanner devices 102, 103, 104, and 105 according to the present embodiment. In the Figure, reference numeral 301 denotes a USB connector portion, with reference numeral 302 being an enlargement of the USB connector portion. Also, reference numeral 303 denotes a USB connector 3 and reference numeral 304 denotes a USB connector 4, so the printer/scanner device has a total of two USB I/F connectors.

Figure 4:
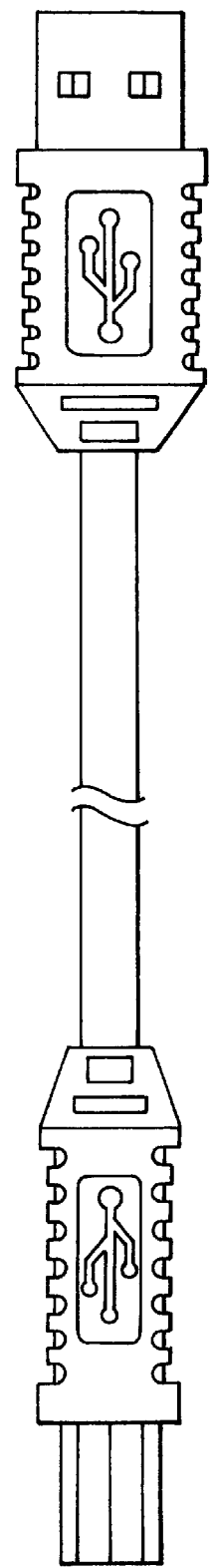
FIG. 4 is a sketch of a USB cable according to the present embodiment.

FIG. 4 is a sketch of a USB cable according to the present embodiment.

USB cables such as shown in FIG. 4 connect the USB connector 1 at the rear side of the host computer 101 to the USB connector 4 at the rear side of the printer/scanner device A 102, the USB connector 2 at the rear side of the host computer 101 to the USB connector 4 at the rear side of the printer/scanner device B 103, the USB connector 3 at the rear side of the printer/scanner device B 103 to the USB connector 4 at the rear side of the printer/scanner device C 104, and moreover, the USB connector 3 at the rear side of the printer/scanner device C 104 to the USB connector 4 at the rear side of the printer/scanner device D 105.

That is to say, the printer/scanner device A 102 and the printer/scanner device B 103 are connected to the hub of the notebook-type host computer 101, the printer/scanner device C 104 is connected to the hub of the printer/scanner device B 103, and the printer/scanner device D 105 is connected to the hub of the printer/scanner device C 104.

Figure 5:
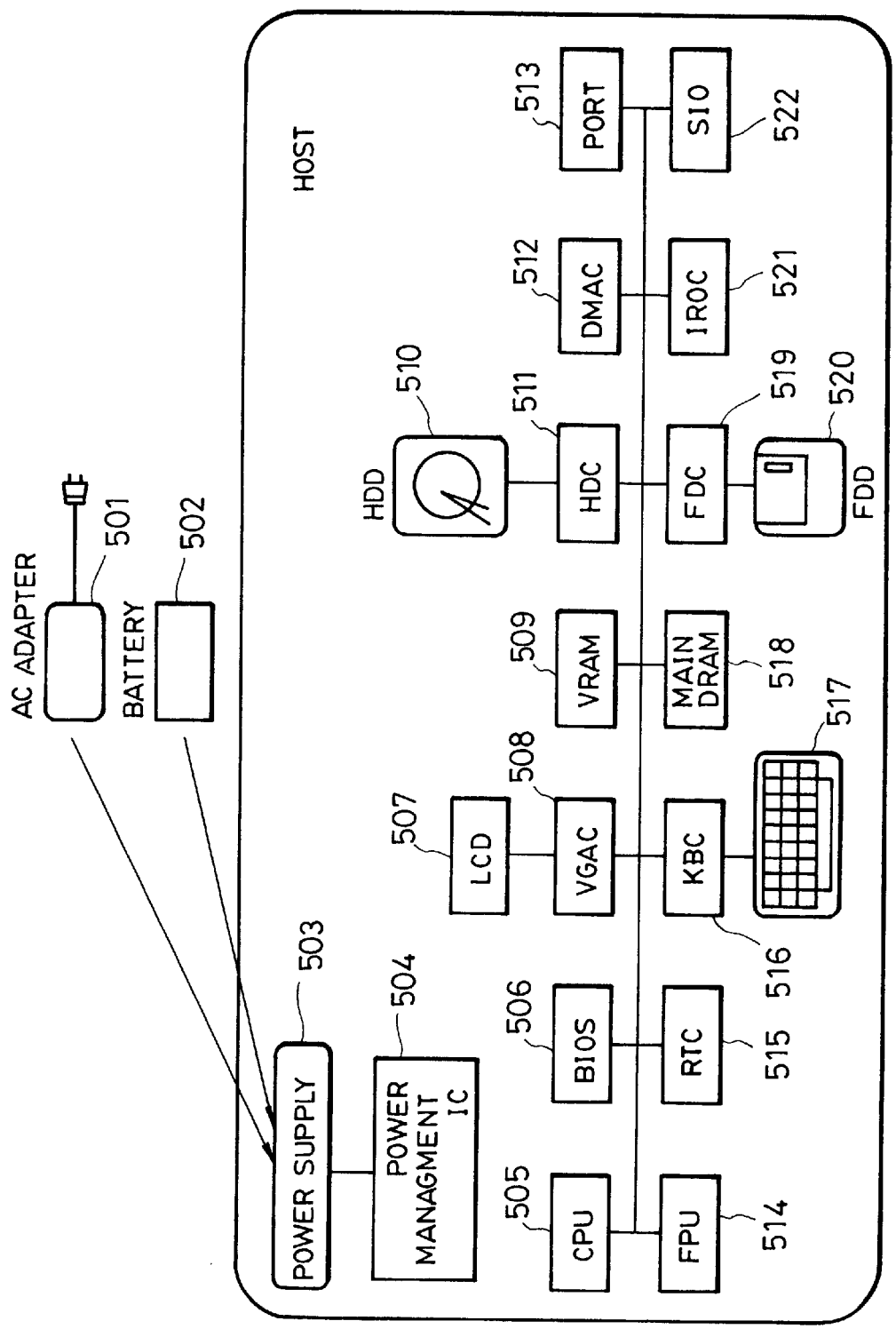
FIG. 5 is a block diagram illustrating the internal configuration of the notebook-type host computer according to the present embodiment.

FIG. 5 is a block diagram illustrating the internal configuration of the notebook-type host computer 101 according to the present embodiment. The host computer 101 is provided with an AC adapter (rated voltage 20 V, 54 W) 501 and a secondary Nickel-Hydrogen battery (rated voltage 12 V, 2700 mA/h) 502. Built-in functions include a power unit 503, Power Management IC 504, CPU 505, BIOS 506, LCD 507, video controller (VGAC) 508, video memory (VRAM) 509, hard disk drive (HDD) 510, hard disk controller (HDC) 511, DMA controller (DMAC) 512, port (PORT) 513, floating-point processing unit (FPU) 514, real-time clock (RTC) 515, keyboard controller (KBC) 516, keyboard 517, system main memory 518, floppy disk controller (FDC) 519, floppy disk drive (FDD) 520, interruption controller (IRQC) 521, serial interface SI0) 522, and so forth. The USB I/F is provided via the USB port contained in the port 513.

Figure 6:
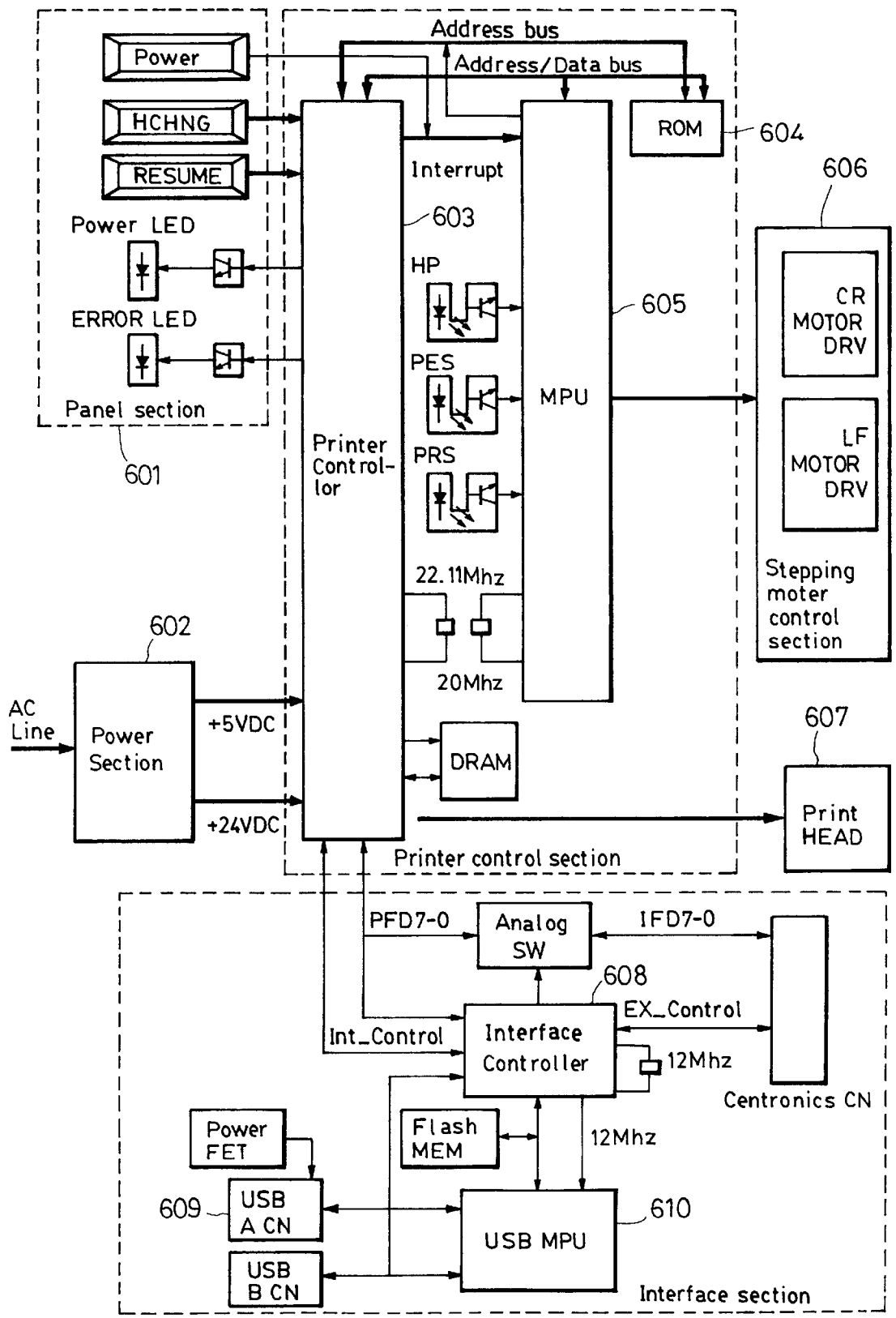
FIG. 6 is a block diagram illustrating the internal configuration of a printer/scanner device according to the present embodiment.

FIG. 6 is a block diagram illustrating the internal configuration of the printer/scanner device according to the present embodiment. In the Figure, reference numeral 601 denotes a panel unit comprised of a resume switch, power display LED, and error display LED switch, reference numeral 602 denotes a power unit, reference numeral 603 denotes a printer controller, reference numeral 604 denotes system memory (ROM), reference numeral 605 denotes a multi-processor unit (MPU), reference numeral 606 denotes a motor control unit comprised of a CR motor (carriage motor) and LF motor (line feed motor), reference numeral 607 denotes a printer head, reference numeral 608 denotes a USB interface controller, reference numeral 609 denotes a USB connector, and reference numeral 610 denotes a USB multi-processor unit (MPU).

Figure 7:
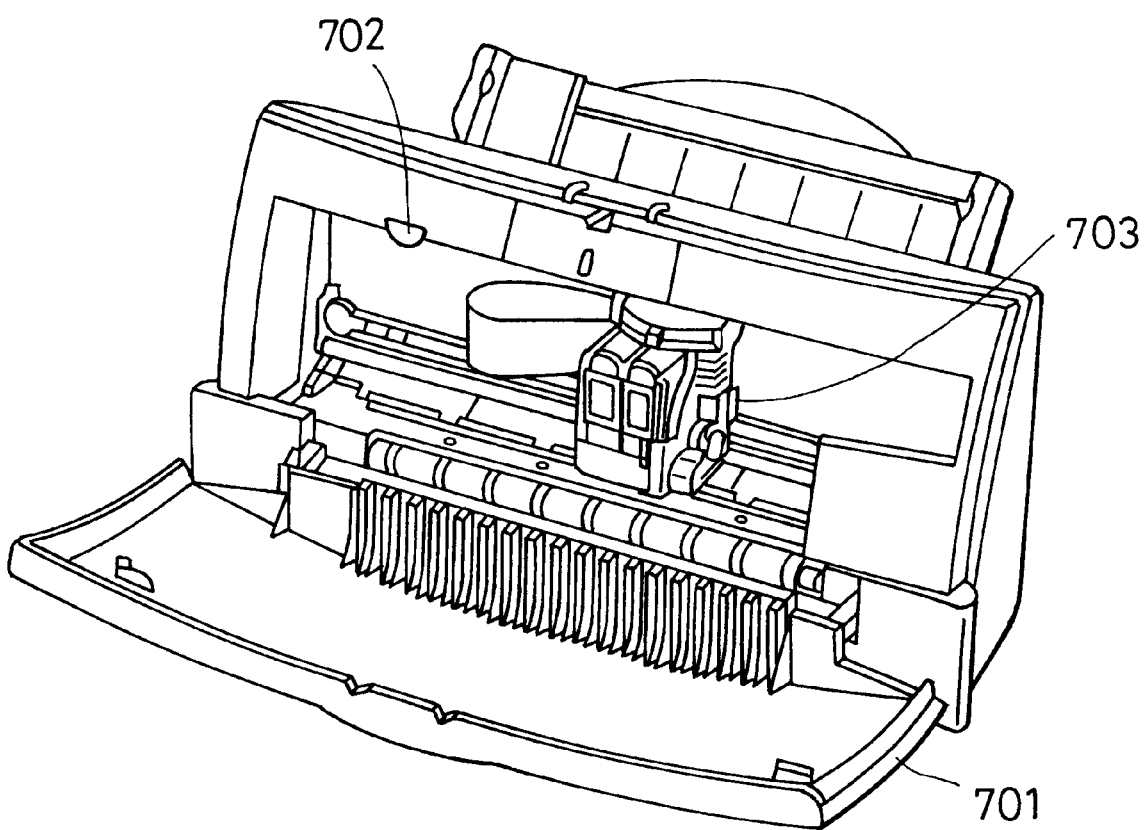
FIG. 7 is a perspective view of a printer/scanner device according to the present embodiment, shown with the front cover open.

FIG. 7 is a perspective view of the printer/scanner device according to the present embodiment, shown with the front cover open. In the Figure, reference numeral 701 denotes the front cover, reference numeral 702 denotes a cartridge exchanging switch, and reference numeral 703 denotes a cartridge holder. The cartridge exchanging switch 702 is a toggle switch. Pressing the cartridge exchanging switch 702 moves the cartridge holder 703 horizontally.

In the initial state, the cartridge holder 703 is positioned at the right end of the printer, when viewed from the front. Pressing the cartridge exchanging switch 702 moves the cartridge holder 703 to the center of the printer, thereby enabling the cartridge to be replaced. Pressing the cartridge exchanging switch 702 once more moves the cartridge holder 703 back to the right end of the printer when viewed from the front.

Figure 8:
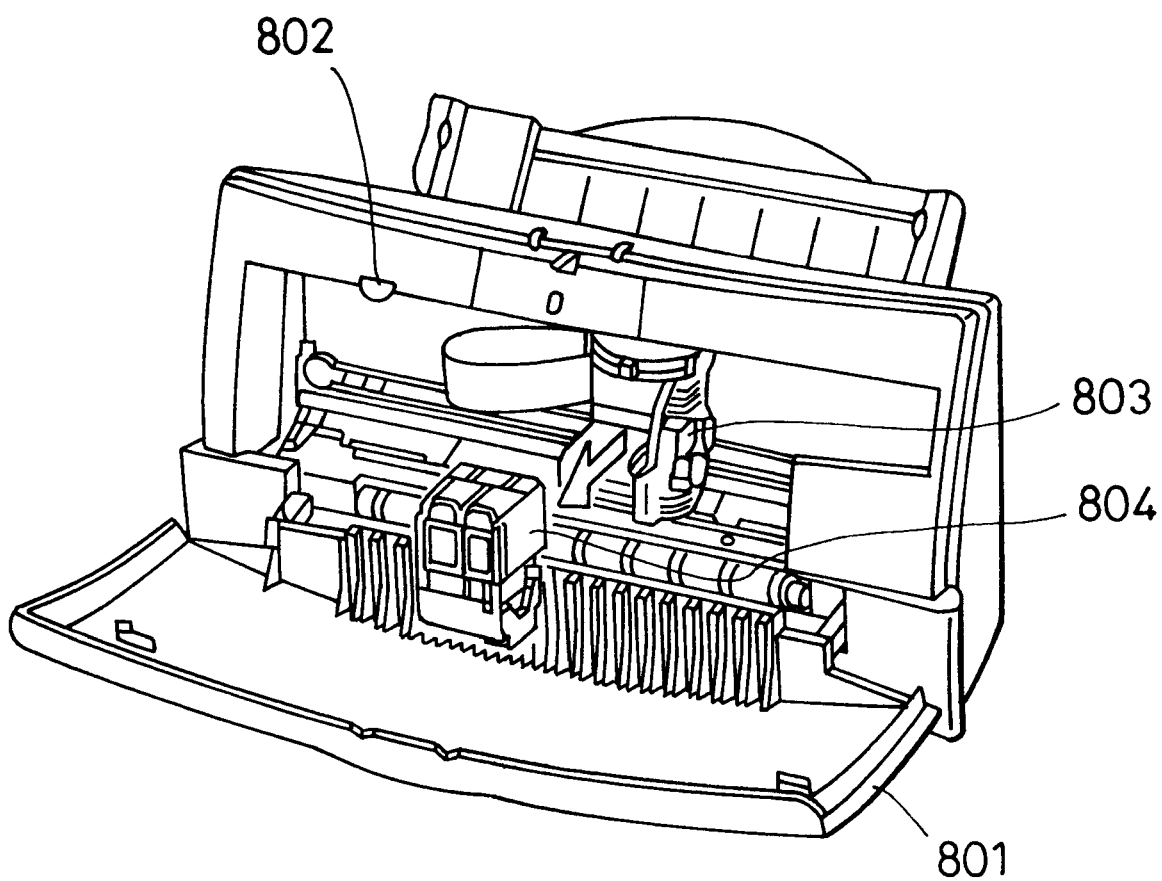
FIG. 8 is a perspective view of a printer/scanner device according to the present embodiment, shown with the front cover open and the cartridge removed.

FIG. 8 is a perspective view of a printer/scanner device according to the present embodiment, shown with the front cover open and the cartridge removed. In the Figure, reference numeral 801 denotes the front cover, reference numeral 802 denotes the cartridge exchanging switch, reference numeral 803 denotes the cartridge holder, and reference numeral 804 denotes a printer cartridge.

The method of removing the cartridge will now be described with reference to FIG. 8.

In order to remove the cartridge, first, pressing the cartridge exchanging switch 802 moves the cartridge holder 803 to the center of the printer, thereby enabling the cartridge to be replaced. Next, a cartridge mounting/detaching lever provided to the cartridge holder 803 is operated to place the cartridge 804 in a removable state. Finally, the cartridge 804 is manually extracted from the cartridge holder 803. Once the cartridge is removed, the printer becomes unavailable for use.

Figure 9:
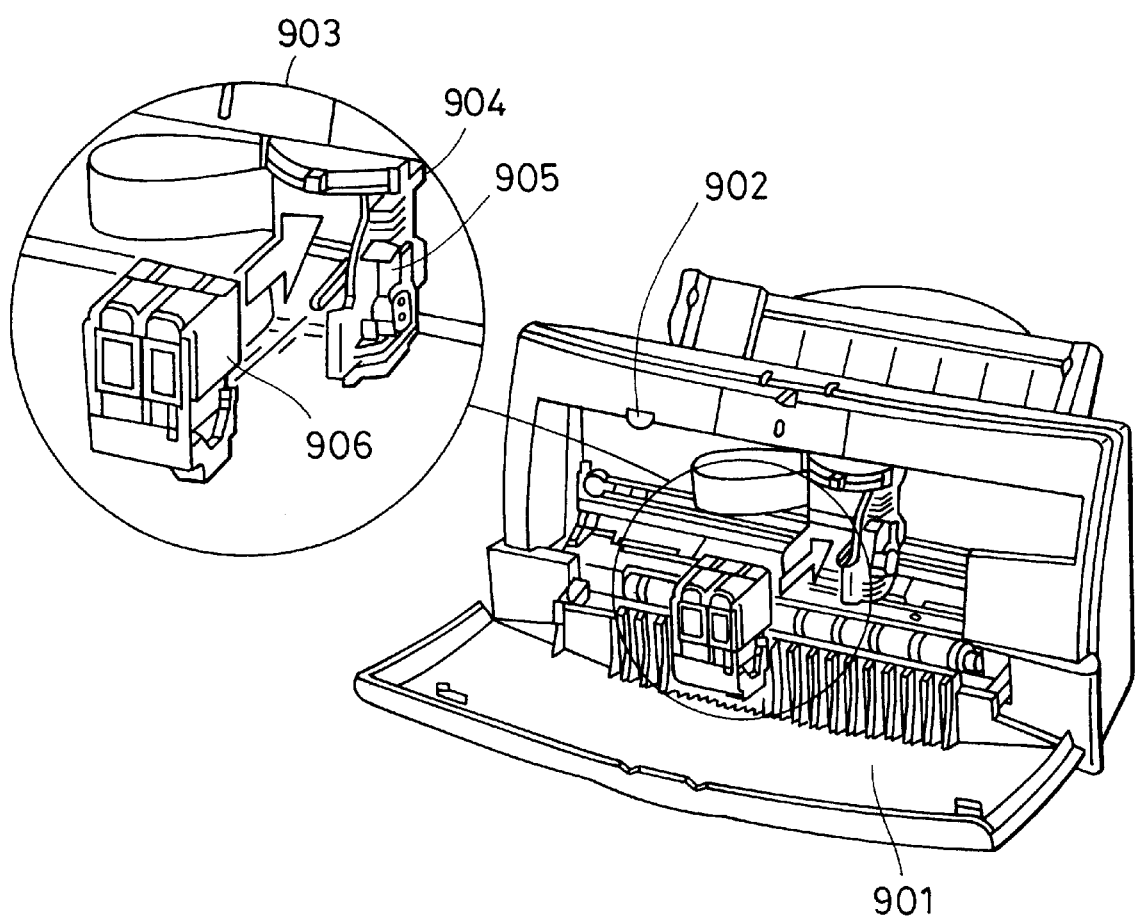
FIG. 9 is a perspective view of a printer/scanner device according to the present embodiment, shown with the front cover open and the cartridge mounted.

FIG. 9 is a perspective view of a printer/scanner device according to the present embodiment, shown with the front cover open and the cartridge mounted. In the Figure, reference numeral 901 denotes the front cover, reference numeral 902 denotes the cartridge exchanging switch, reference numeral 903 is an enlarged drawing of the cartridge holder unit, reference numeral 904 denotes the cartridge holder, reference numeral 905 denotes the cartridge mounting/detaching lever, and reference numeral 906 denotes the printer cartridge.

The method of mounting the cartridge will now be described with reference to FIG. 9.

In order to mount the cartridge, first, the cartridge 906 is manually mounted to the cartridge holder 904. Next, the cartridge mounting/detaching lever 905 provided to the cartridge holder 904 is operated to fix the cartridge 906 to the cartridge holder 904. Finally, pressing the cartridge exchanging switch 902 moves the cartridge holder 904 to the right end of the printer when viewed from the front. Once the cartridge is mounted, the printer becomes available for use.

Figure 10:
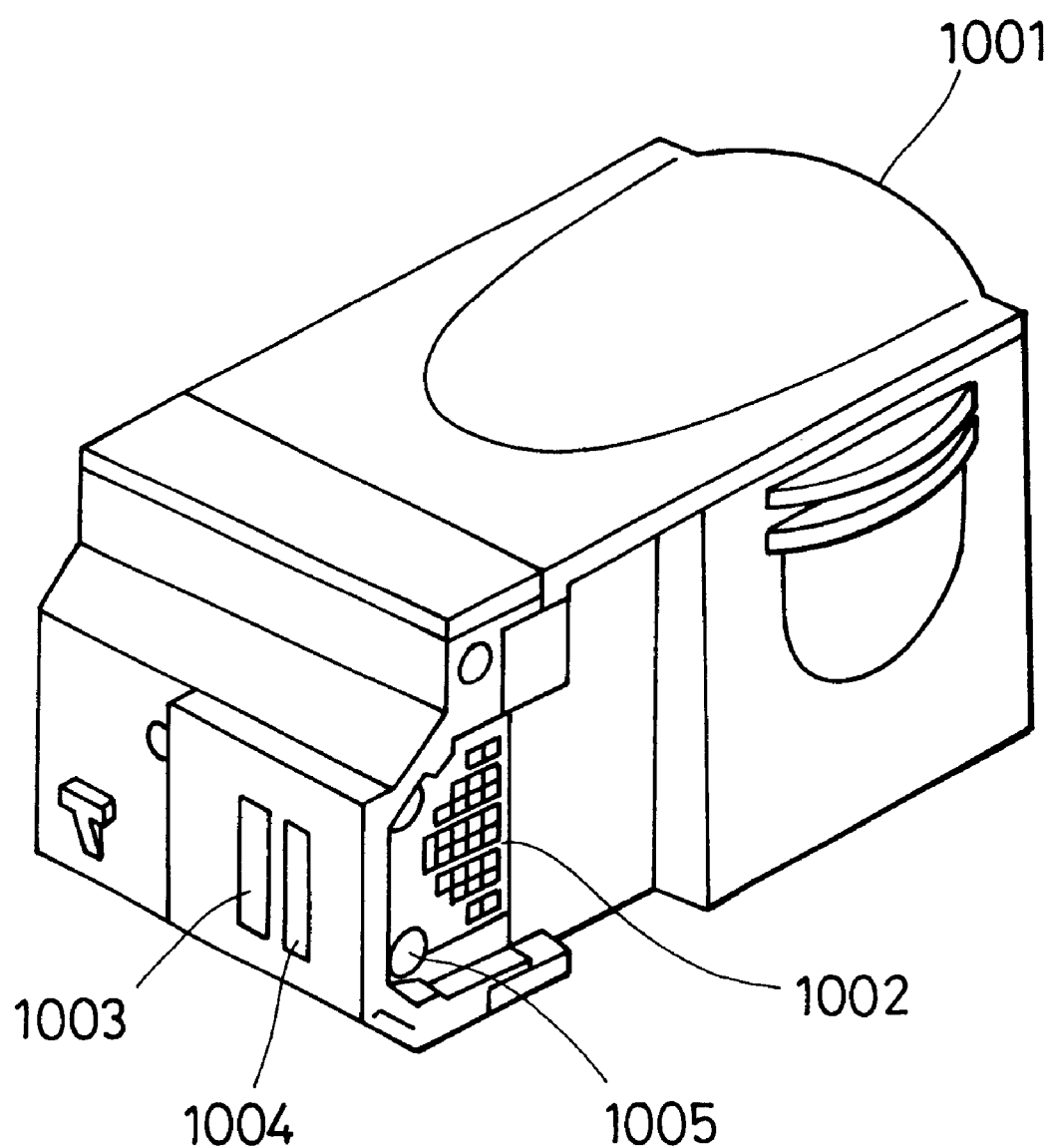
FIG. 10 is a perspective view of a scanner cartridge which can be mounted to the printer/scanner device according to the present invention.

FIG. 10 is a perspective view of a scanner cartridge which can be mounted to the printer/scanner device according to the present invention. In the Figure, reference numeral 1001 denotes the housing of the scanner cartridge, reference numeral 1002 denotes a connector unit serving as an internal I/F for making electric contact at the time of mounting to the cartridge holder, reference numeral 1003 denotes a light emitting portion of tri-color (red, green, blue) LEDs (light-emitting diodes) serving as the light source for illuminating documents, and reference numeral 1004 denotes a photo-receptor portion for receiving reflected light from the document. The light reflected from the document is converted into image data using a photo-electric converter device (Basic sensor).

The scanner cartridge 1001 used for scanning images and the printer cartridge used for scanning are of the same form, and can be mounted and detached to and from the printer/scanner device. There are also a total of five printer cartridges, i.e., one type of B/W printer cartridge and four types of color cartridges.

Next, description will be made regarding the method for controlling the information processing apparatus comprised of a plurality of printer/scanner devices connected to the host computer 101 with the above-described configuration.

Figure 11:
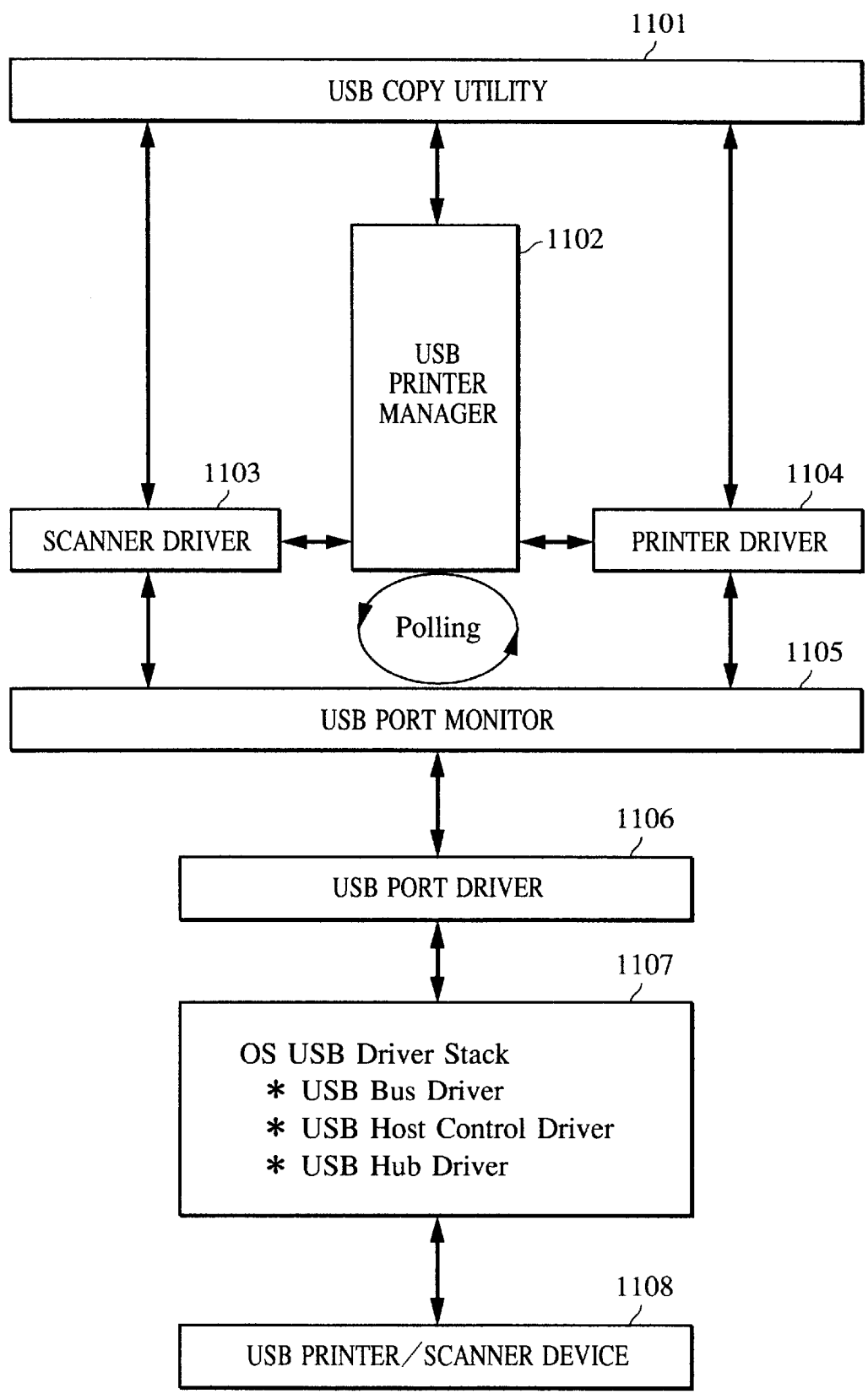
FIG. 11 is a block diagram of software controlling the printer/scanner device.

FIG. 11 is a block diagram of software controlling the printer/scanner devices 102, 103, 104, and 105, in the above-described arrangement, wherein the plurality of printer/scanner devices are connected to the host computer 101.

In the Figure, 1101 is a USB copy utility, which is application software having the function of taking image data read from a certain printer/scanner device and printing it from a certain printer/scanner device. The USB copy utility 1101 is capable of obtaining printer/scanner device information from a USB printer manager 1102 by means of a dedicated API.

The USB printer manager 1102 is surveillance control software which performs surveillance of the status of the printer/scanner devices, and has functions such as notifying other software programs of printer/scanner device information, automatically starting the USB copy utility 1101 according to changes in the status of the printer/scanner device, and so forth.

A scan driver (IS Scan USB) 1103 is device driver software provided with the functions of controlling a certain printer/scanner device so as to scan and read image data, and transfer the read image data to certain application software. The scan driver 1103 is capable of obtaining printer/scanner device information from the USB printer manager 1102 by means of dedicated API.

The printer driver 1104 is device driver software provided with the functions of controlling a certain printer/scanner device so as to print image data generated by certain application software. In order to print using all printer/scanner devices existing in the system, the printer driver 1104 must correlate and register each printer/scanner device connected to the system, one at a time (see FIG. 20).

The printer driver 1104 is capable of obtaining printer/scanner device information from the USB printer manager 1102 by means of dedicated API.

A USB port monitor 1105 provides an application programming interface (API) which the USB printer manager 1102, scan driver 1103, and printer driver 1104 use to control the printer/scanner devices.

Regarding the API, USB port control commands are provided, such as an open command for opening a certain USB port, a close command for closing a certain USB port, a data write command for writing data to a certain USB port, a data read command for reading data from a certain USB port, and so forth.

In the event that the USB printer manager 1102, scan driver 1103, and printer driver 1104 call the API, the USB port monitor 1105 interprets the command for the called API, and then converts the API command and hands it to a later-described USB port driver 1106.

The USB port driver 1106 interprets the command received from the USB port monitor 1105, and then converts the API command and hands it to a later-described OS USB driver stack 1107.

The operating system USB driver stack (OS USB driver stack) 1107 directly controls the USB ports of the host computer 101 and exchanges data with the USB printer/scanner devices 1108, based on control commands received from the USB port driver 1106.

Each of the above software programs are opened in the system main memory 518 of the host computer 101 and executed by a CPU 505.

Figure 12:
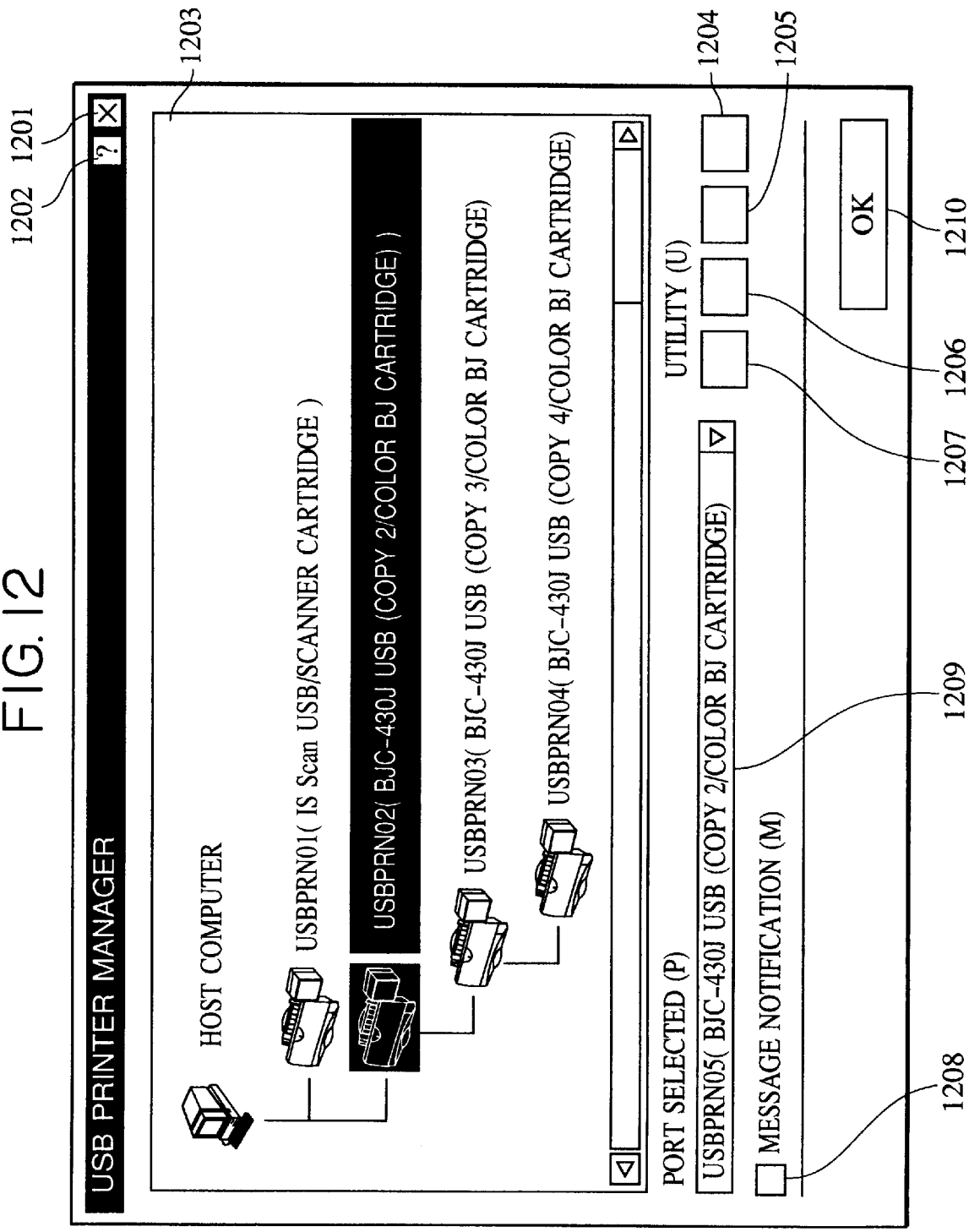
FIG. 12 is an explanatory diagram of a user interface main screen which the USB printer manager displays.

FIG. 12 is an explanatory diagram of a user interface main screen which the USB printer manager 1102 displays, in an information processing apparatus connected as shown in FIG. 1.

In the Figure, reference numeral 1201 denotes a quit button, and pressing this ends the USB printer manager 1102. Pressing the help button 1202 displays help information.

A USB connection status display area 1203 displays an overhead view of the USB connection status of the printer/scanner devices. A nozzle check pattern printing button 1204 is provided, which, when pressed, issues a command to the printer/scanner device that is selected at the USB connection status display area 1203 to start printing the nozzle check pattern. A demo pattern printing button 1205 is also provided, which, when pressed, issues a command to the printer/scanner device that is selected at the USB connection status display area 1203 to start printing the demo pattern. A cleaning button 1206 is further provided, which, when this is pressed, issues a command to the printer/scanner device that is selected at the USB connection status display area 1203 to start cleaning. A cartridge exchange button 1207 is also provided, which, when pressed, issues a command to the printer/scanner device that is selected at the USB connection status display area 1203 to start the process of exchanging the cartridge. Reference numeral 1208 denotes a message notification checkbox. The port selection box 1209 can be operated to change the printer/scanner device selected at the USB connection status display area 1203. Pressing the OK button 1210 reduces the display size of the USB printer manager 1102.

Figure 13:
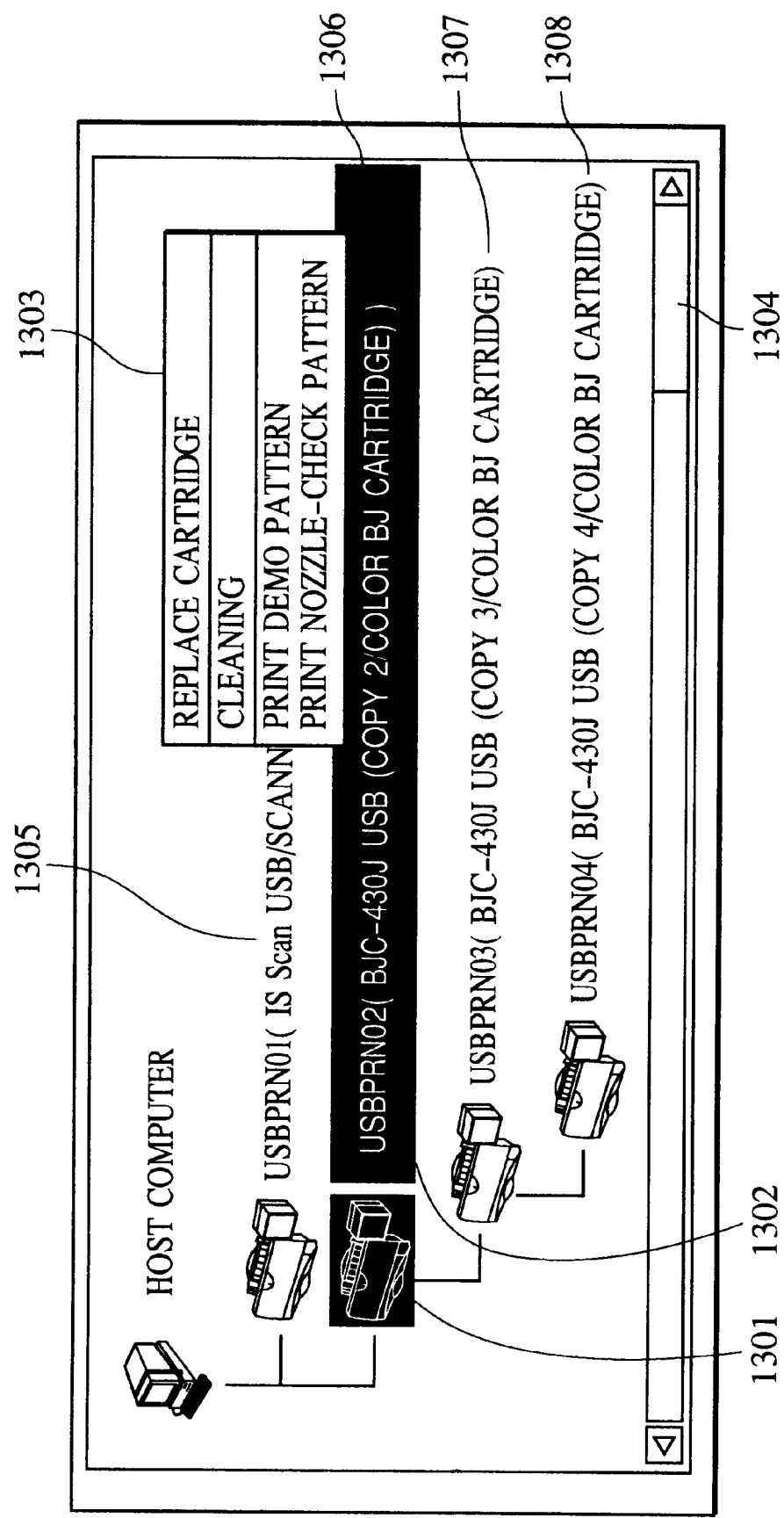
FIG. 13 is a detailed explanatory diagram of the USB connection status display area.

FIG. 13 is a detailed explanatory diagram of the USB connection status display area 1203. In the Figure, reference numeral 1301 denotes a bit-map representing the state of the printer/scanner device connected to the USB port. Reference numeral 1302 denotes text representing the state of the printer/scanner device connected to the USB port, and reference numeral 1303 denotes a simple-control function pop-up menu, which is displayed by clicking within the connection status display area with the right button of a mouse connected to the host computer.

The scroll bar 1304 can be operated to move the display screen in the USB connection status display area horizontally. Reference numeral 1305 indicates the status display portion for the printer/scanner device A 102 shown in FIG. 1, reference numeral 1306 indicates the status display portion for the printer/scanner device B 103 shown in FIG. 1, reference numeral 1307 indicates the status display portion for the printer/scanner device C 104 shown in FIG. 1, and reference numeral 1308 indicates the status display portion for the printer/scanner device D 105 shown in FIG. 1.

Figure 14:
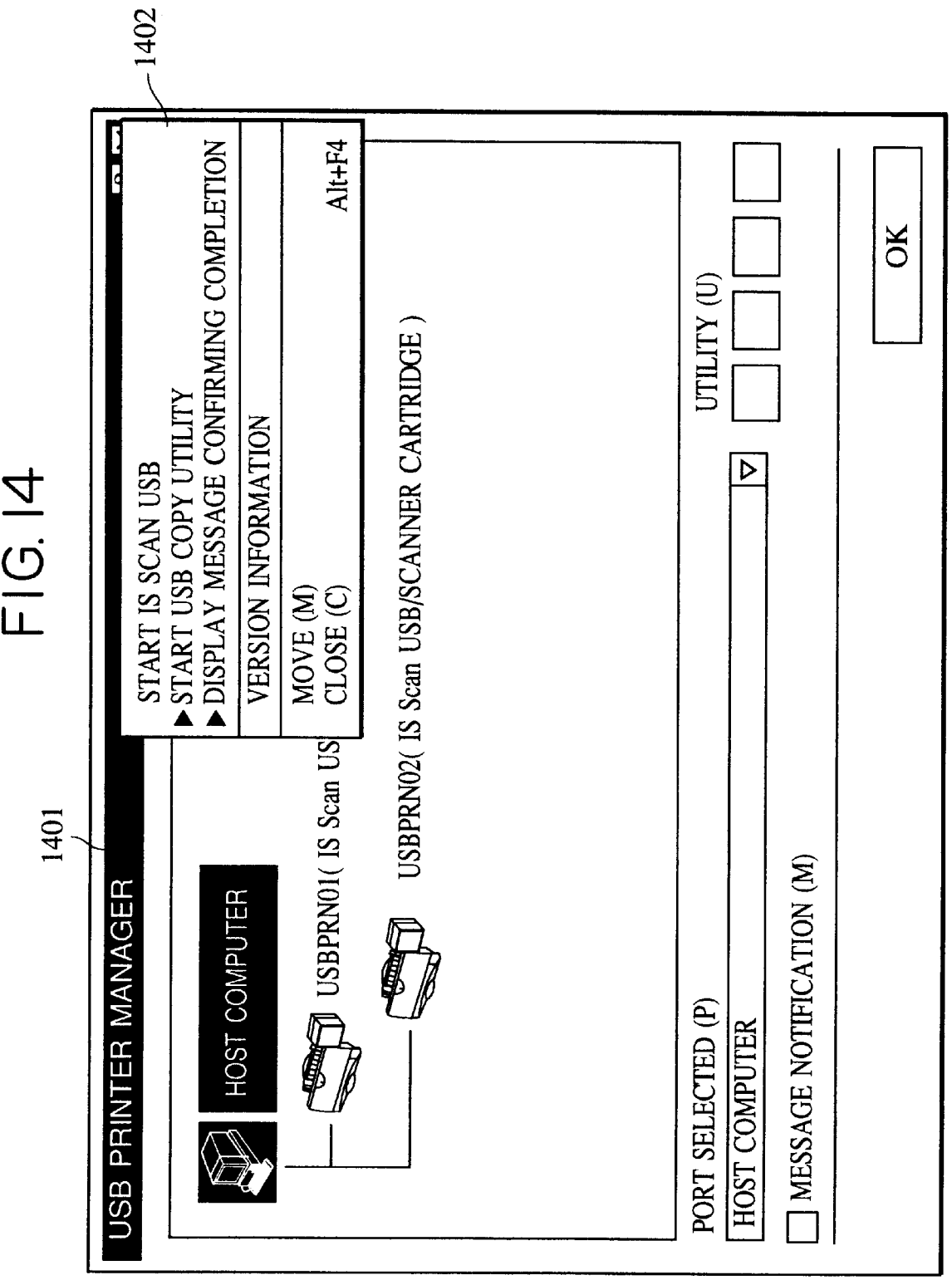
FIG. 14 is an explanatory diagram of the display screen in the event that a mouse connected to the host computer is used to right-click on the title bar of the USB printer manager, in an arrangement wherein two printer/scanner devices are connected to the host computer.

FIG. 14 is an explanatory diagram of the display screen in the event that a mouse connected to the host computer 101 is used to right-click on the title bar of the USB printer manager 1102, in an arrangement wherein two printer/scanner devices are connected to the host computer 101. In the Figure, reference numeral 1401 denotes a title bar, and reference numeral 1401 denotes the system menu.

Figure 15:
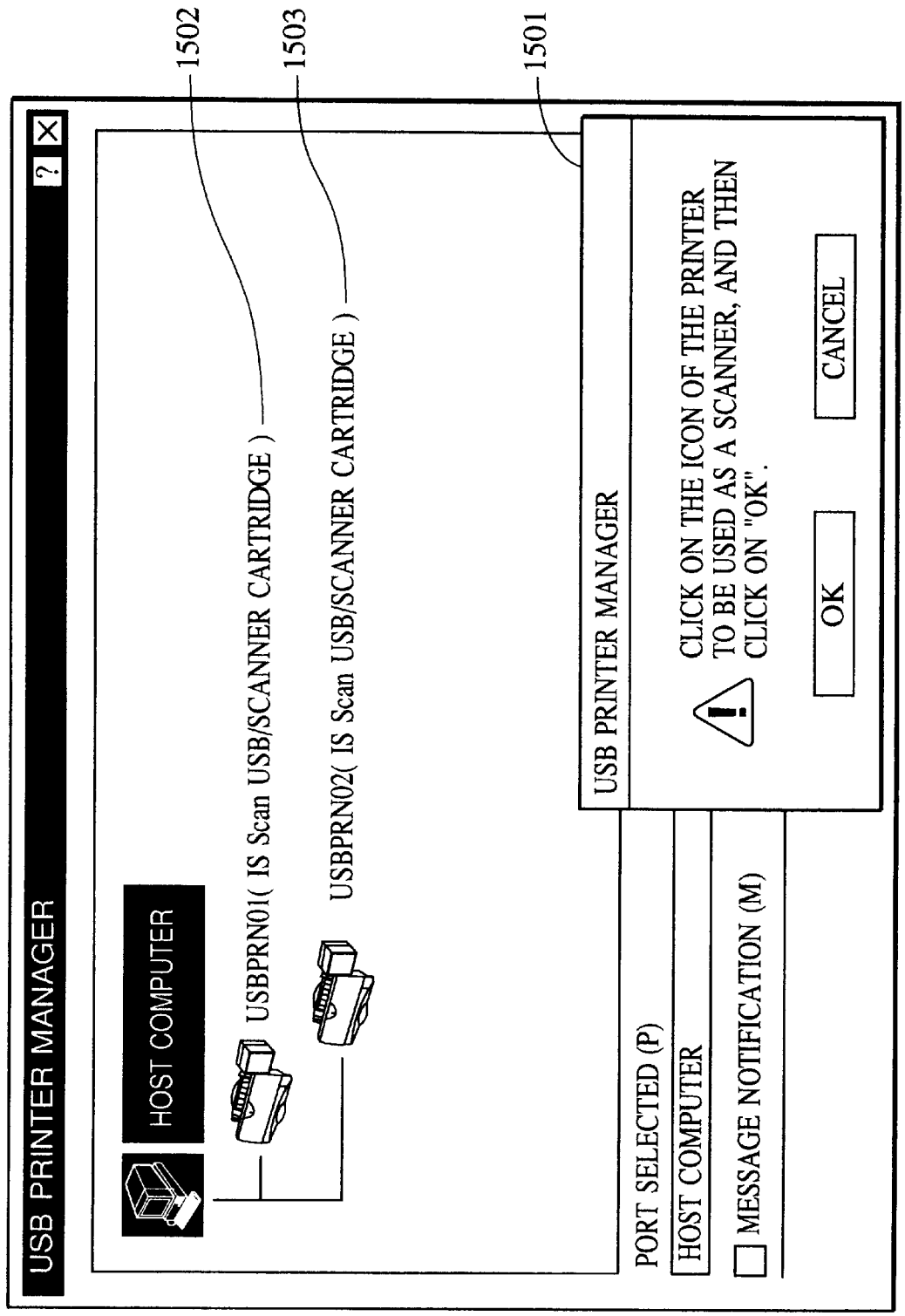
FIG. 15 is an explanatory diagram of the display screen in the event that the USB copy utility and scanner driver issue a command to the USB printer manager to select a printer/scanner device available for scanning, in an arrangement wherein two printer/scanner devices are connected to the host computer.

FIG. 15 is an explanatory diagram of the display screen in the event that the USB copy utility 1101 and scanner driver 1103 issue a command to the USB printer manager 1102 to select a printer/scanner device available for scanning, in an arrangement wherein two printer/scanner devices are connected to the host computer 101. In the Figure, reference numeral 1501 denotes a printer/scanner device selection request message window to be used for scanning, reference numeral 1502 denotes a printer/scanner device A 102 available for scanning, and reference numeral 1503 denotes a printer/scanner device B 104 available for scanning.

Figure 16:
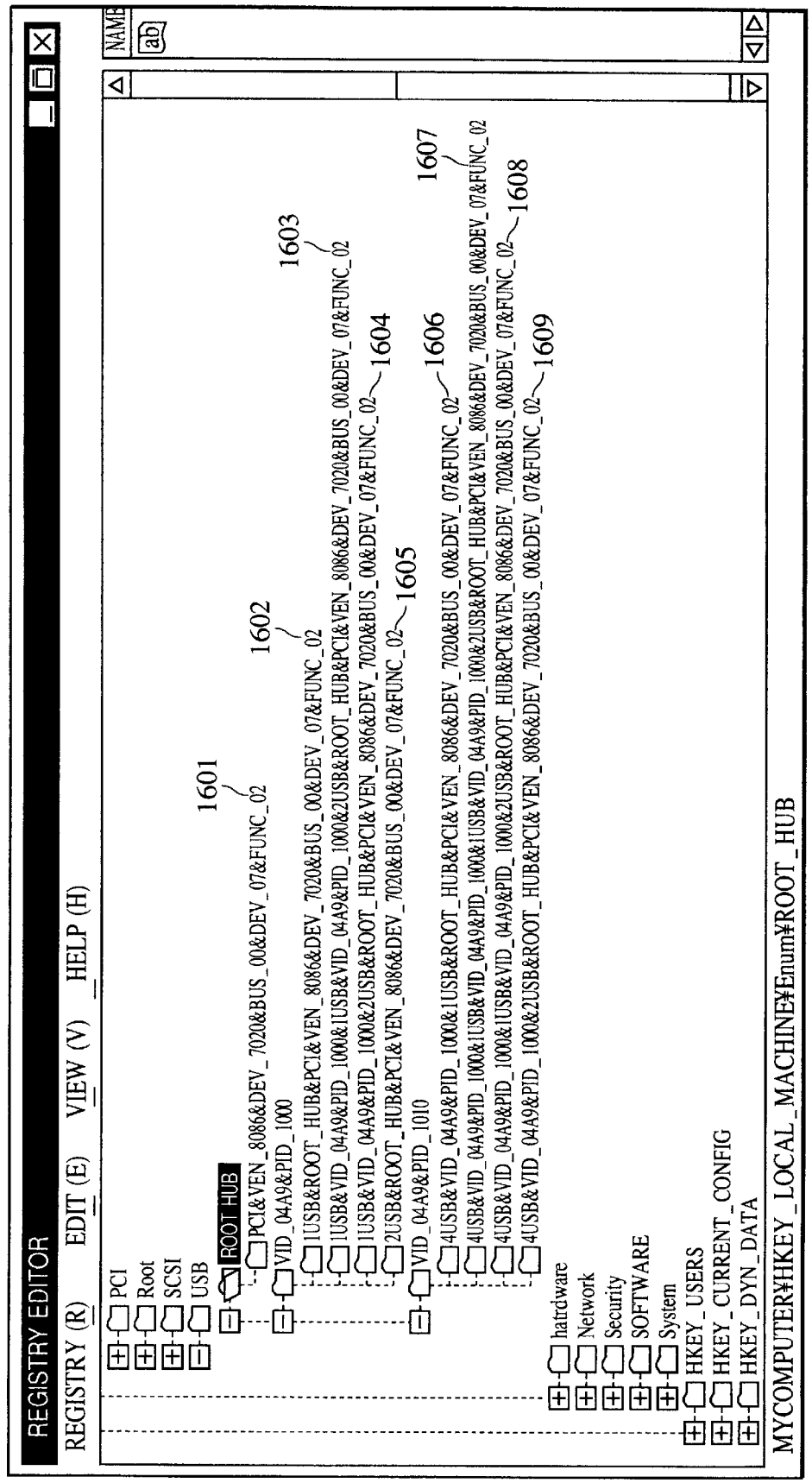
FIG. 16 is a diagram illustrating connection information for printer/scanner devices, stored in the host computer.

FIG. 16 illustrates connection information for printer/scanner devices, stored in the host computer 101 in an information processing system connected such as shown in FIG. 1.

This connection information is created by the operating system, and is saved in a system setting information database (registry) provided by the operating system.

Figure 35:
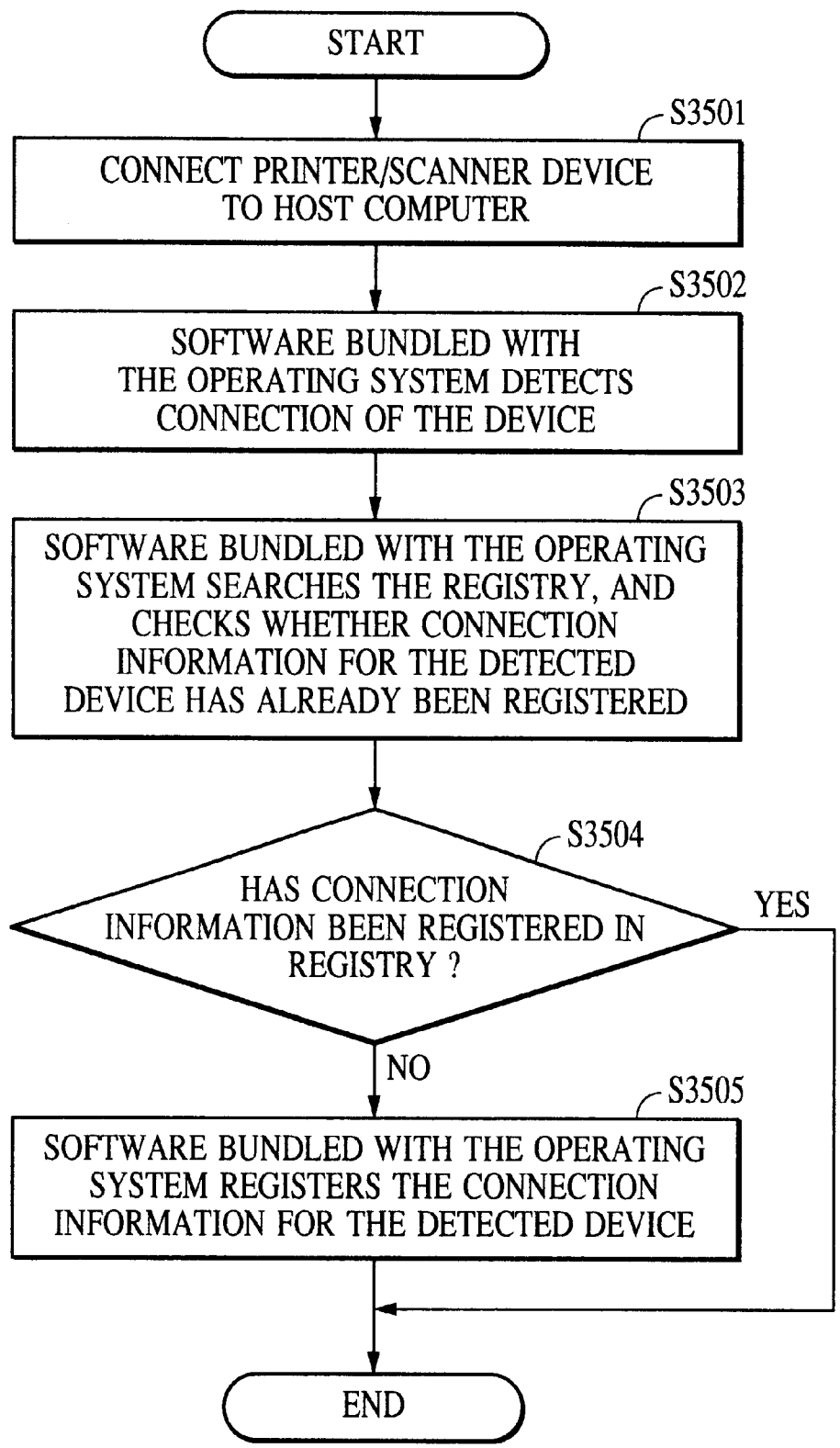
FIG. 35 is a flowchart illustrating the procedures for registry management with the operating system.

The process for creating the system setting information database (registry) with the operating system will now be described with reference to FIG. 35.

First, in step S3501, the user connects a printer/scanner device to the host computer 101.

Next, in step S3502, software bundled with the operating system (i.e., the OS USB Driver Stack (1107)) detects the connection of the device. Then, proceeding to step S3503, the software bundled with the operating system searches the registry and checks whether or not connection information for the detected device has already been registered. Next, in step S3504, judgment is passed whether or not the connection information has been registered.

In the event that judgment is made in step S3504 that the connection information has not been registered, the flow proceeds to step S3505, the software bundled with the operating system registers the connection information for the detected device in the registry, and the flow ends. In the event that judgment is made in step S3504 that the connection information has already been registered, the flow ends here.

In FIG. 16, reference numeral 1601 denotes the connection information of the USB hub which the host computer 101 has, 1602 denotes the connection information of the hub which the printer/scanner device A 102 has, 1603 denotes the connection information of the hub which the printer/scanner device D 105 has, 1604 denotes the connection information of the hub which the printer/scanner device C 104 has, 1605 denotes the connection information of the hub which the printer/scanner device B 103 has, 1606 denotes the connection information of the printer/scanner device A 102, 1607 denotes the connection information of the printer/scanner device D 105, 1608 denotes the connection information of the printer/scanner device C 104, and reference numeral 1609 denotes the connection information of the printer/scanner device B 103. The connection information changes according to the connection status of the printer/scanner device.

Also, connection information of a certain printer/scanner device also includes without fail the connection information of the hub to which that printer/scanner device is connected.

For example, the connection information "PCI&VEN_8086&DEV_7020&BUS_00&DEV_07&FUNC_02" of the USB hub of the host computer 101 to which the printer/scanner device A 102 is connected, is included in the connection information 1606 "4USB&VID_04A9&PID_1000&1USB&ROOT_HUB&PCI&VEN_8086&DEV_7020&BUS_00&DEV_07&FUNC_02" of the printer/scanner device A102.

The character string "1USB" contained in the connection information 1606 "4USB&VID_04A9&PID_1000&1USB&ROOT_HUB&PCI . . . " of the printer/scanner device A 102 indicates that the printer/scanner device A 102 is connected to USB hub 1 of the two USB hubs provided to the host computer 101.

Figure 17:
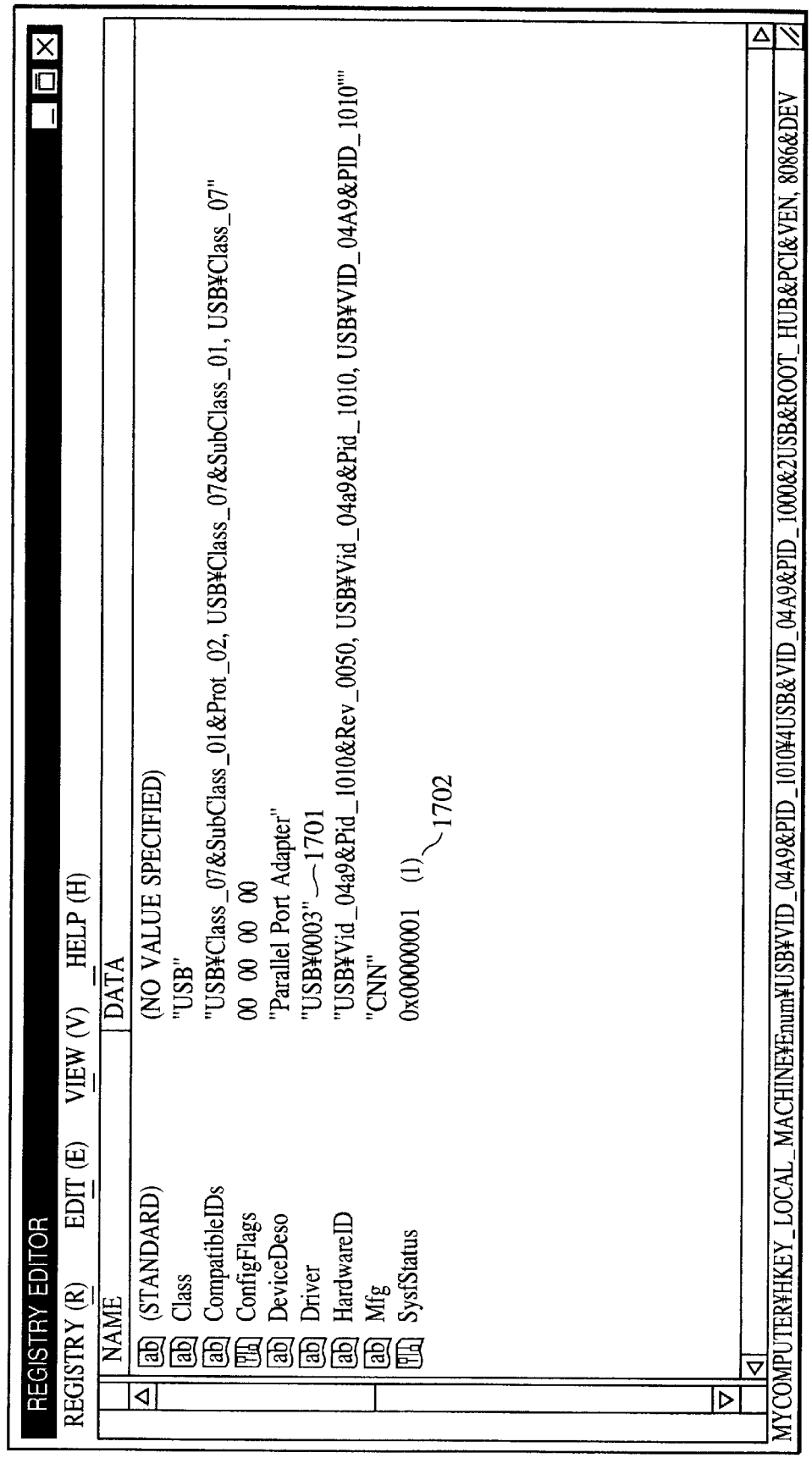
FIG. 17 is a diagram showing detailed information for the printer/scanner device A, stored in the host computer.

FIG. 17 is a diagram showing detailed information for the printer/scanner device A 102 which has been correlated with the connection information 1602 of the printer/scanner device A 102 shown in FIG. 16, in an information processing system connected as shown in FIG. 1.

This detailed information is stored in the host computer in file format. In the Figure, reference numeral 1701 denotes device driver registration information correlated with the printer/scanner device A102. In the present embodiment, the device driver correlated with the printer/scanner device A 102 is "USB¥0003". Reference numeral 1702 denotes status information for the printer/scanner device A 102. In the event that the printer/scanner device A 102 is properly connected with a USB I/F, the value thereof is set to "0x00000001". On the other hand, in the event that the printer/scanner device A 102 is not properly connected with a USB I/F, this value is set to "0x00000000".

Though only description regarding the detailed information for the printer/scanner device A 102 which has been correlated with the connection information of the printer/scanner device A 102 is made in the present embodiment, the system also has detailed information for each printer/scanner device correlated with the connection information of the printer/scanner device B 103, printer/scanner device C 104, and printer/scanner device D 105, in the same format.

Figure 18:
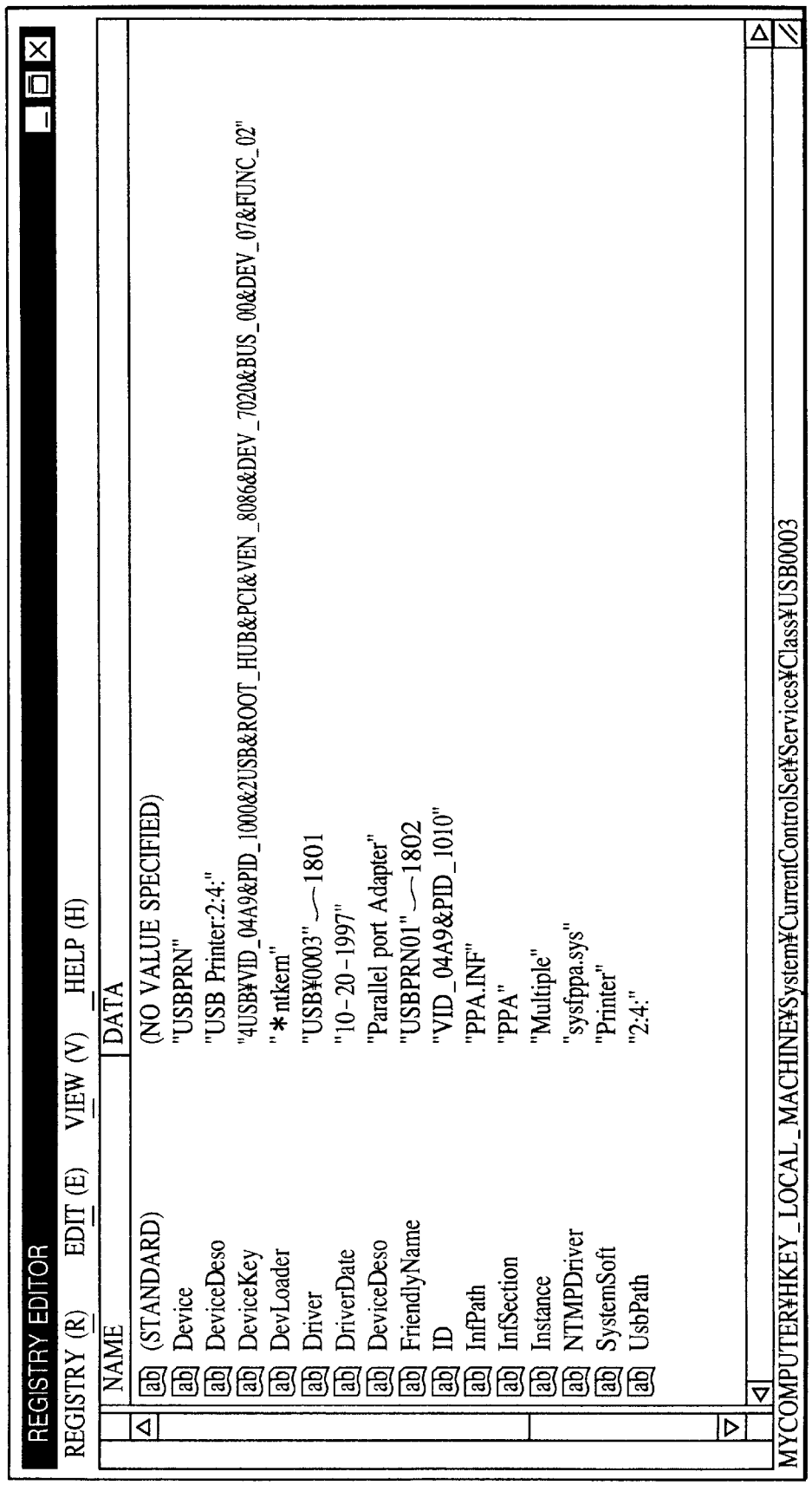
FIG. 18 is a diagram illustrating port connection information for the printer/scanner device A, stored in the host computer.

FIG. 18 is a diagram illustrating port connection information for the printer/scanner device A 102, which has been correlated with the detailed information of the printer/scanner device A102 shown in FIG. 17, in an information processing system connected as shown in FIG. 1.

This port connection information is stored in the host computer in file format. In the Figure, reference numeral 1801 denotes device driver registration information correlated with the printer/scanner device A 102. In the present embodiment, the device driver correlated with the printer/scanner device A 102 is "USB¥0003". This registration information is the same as the device driver registration information 1701 correlated with the printer/scanner device A 102.

Reference numeral 1802 denotes connection port information for the printer/scanner device A 102. In the present embodiment, the connection port of the printer/scanner device A 102 is "USBPRN01".

Though only description regarding the port connection information for the printer/scanner device A 102 which has been correlated with the connection information of the printer/scanner device A102 is made in the present embodiment, the system also has detailed information for each printer/scanner device correlated with the connection information of the printer/scanner device B 103, printer/scanner device C 104, and printer/scanner device D 105, in the same format.

Figure 19:
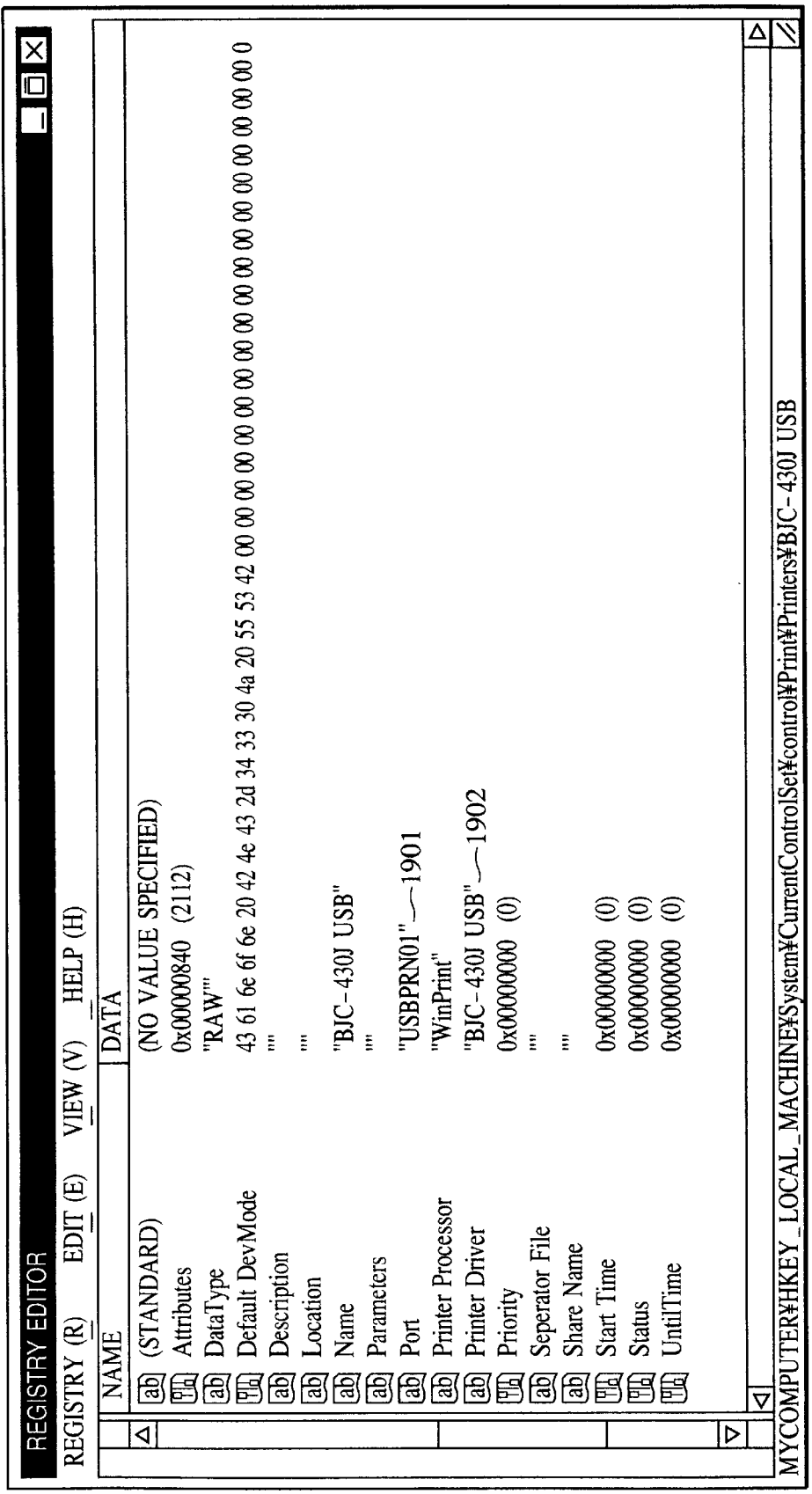
FIG. 19 is a diagram illustrating detailed information for the printer driver registered in correlation with the printer/scanner device A, stored in the host computer.

FIG. 19 is a diagram illustrating detailed information for the printer driver registered in correlation with the printer/scanner device A 102, in an information processing system connected as shown in FIG. 1. This information is correlated with the port connection information of the printer/scanner device A 102.

This port connection information is stored in the host computer 101 in file format, only in the event that the printer driver 1104 is registered in correlation with the printer/scanner device.

In the Figure, reference numeral 1901 denotes port connection information for the printer/scanner device A 102. This information is the same as the port connection information 1802 for the printer/scanner device A 102. Reference numeral 1902 denotes a friendly name for the printer driver registered in correlation with the printer/scanner device A 102. In the present embodiment, the a friendly name for the printer driver registered in correlation with the printer/scanner device A 102 is "BJC-430J USB".

Though only description regarding detailed information for the printer driver registered in correlation with the printer/scanner device A 102 is made in the present embodiment, the system also has detailed information for each printer/scanner device correlated with the connection information of the printer/scanner device B 103, printer/scanner device C 104, and printer/scanner device D 105, in the same format.

Figure 20:
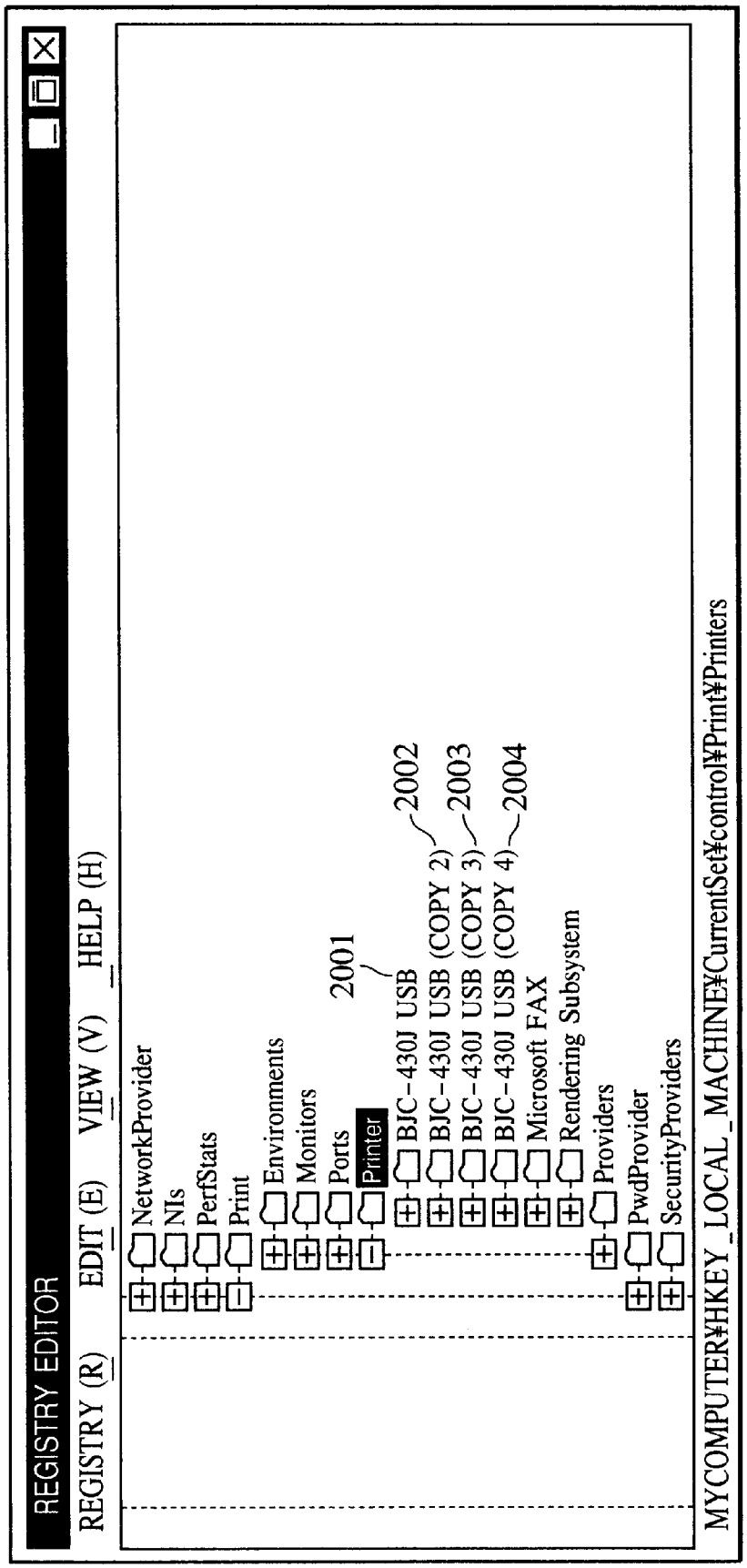
FIG. 20 is a diagram showing registered information for the printer driver stored in the host computer.
Figure 24:
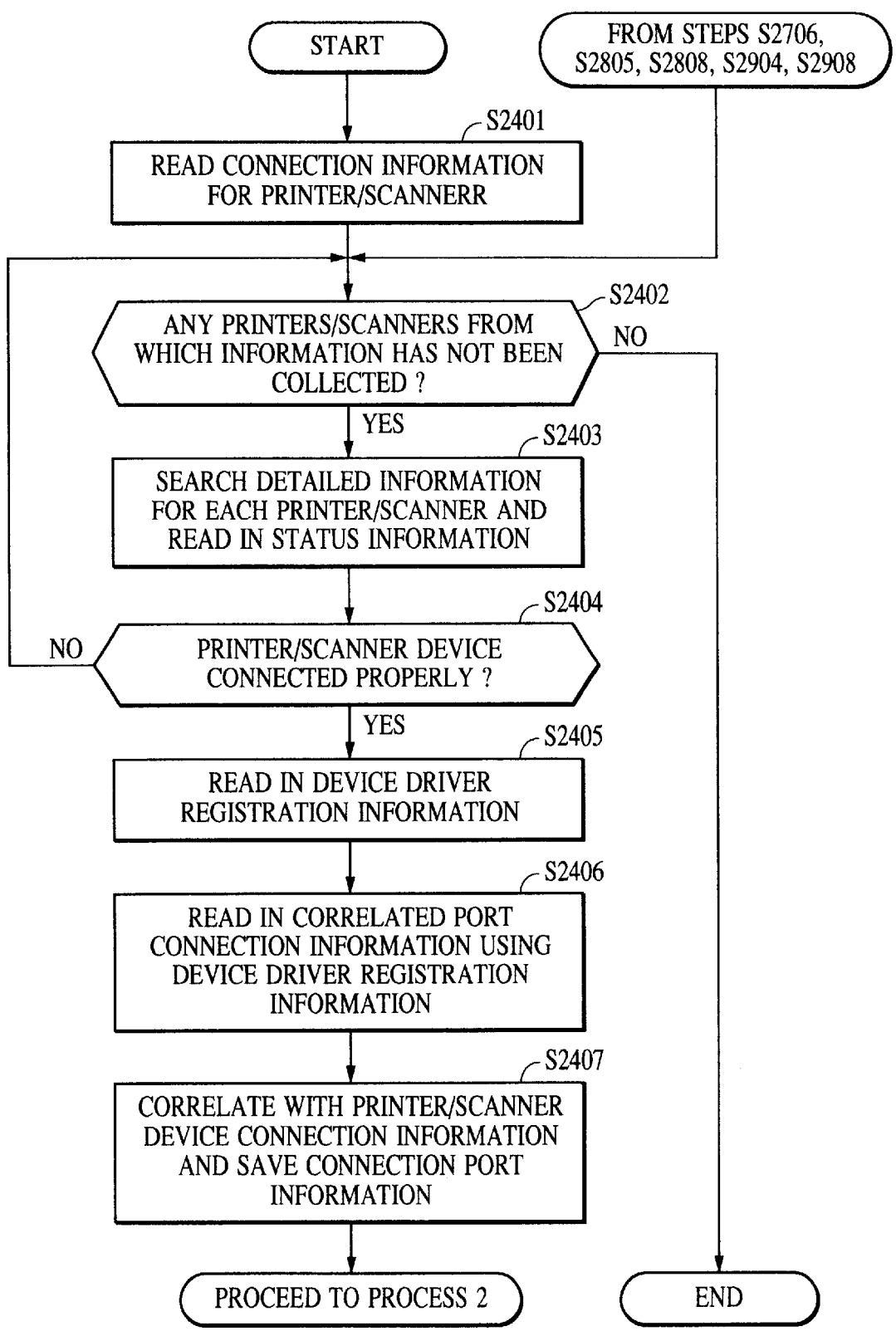
FIG. 24 is a flowchart illustrating the procedures for obtaining information for a printer/scanner device.
Figure 25:
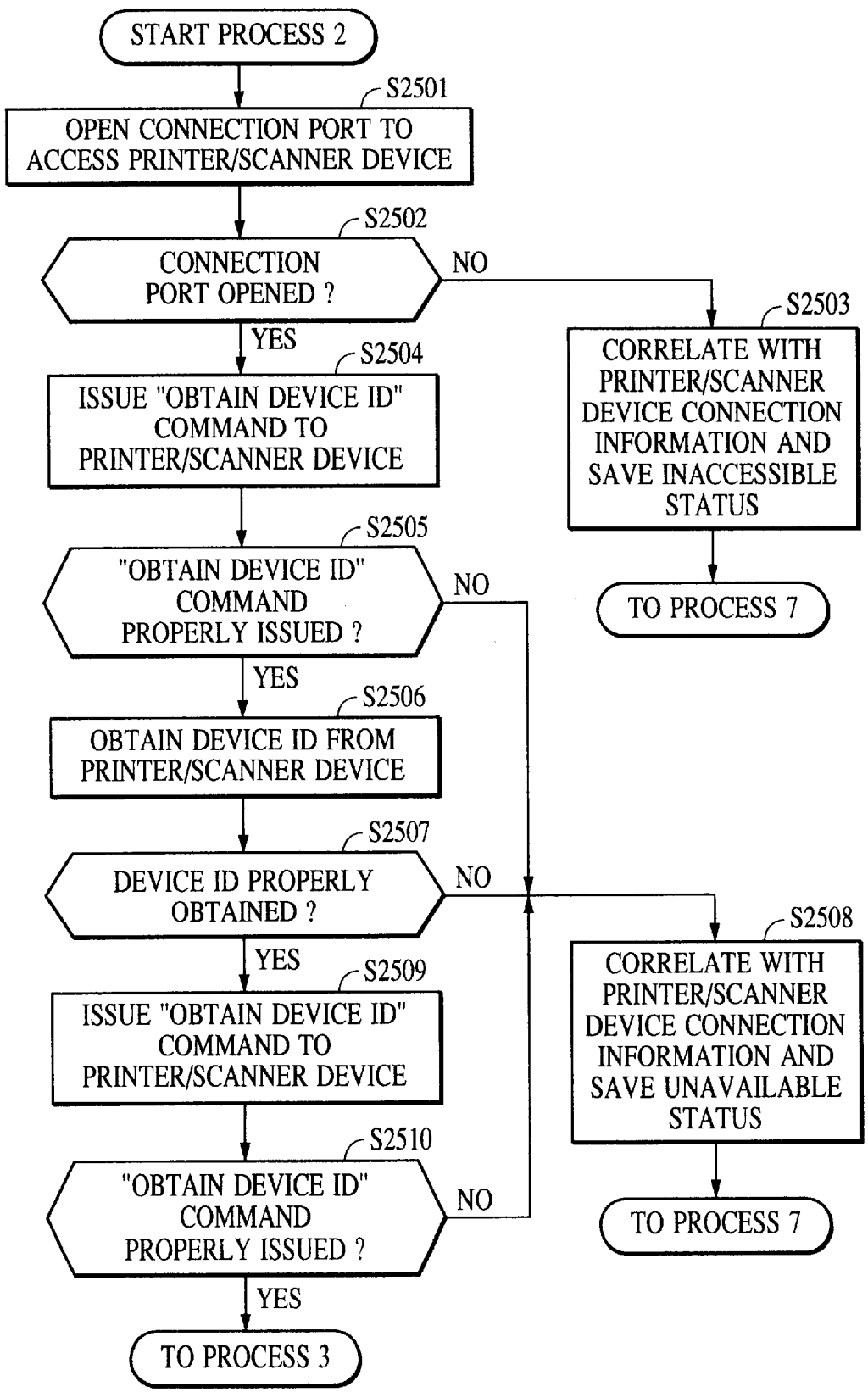
FIG. 25 is another flowchart illustrating the procedures for obtaining information for a printer/scanner device.
Figure 26:
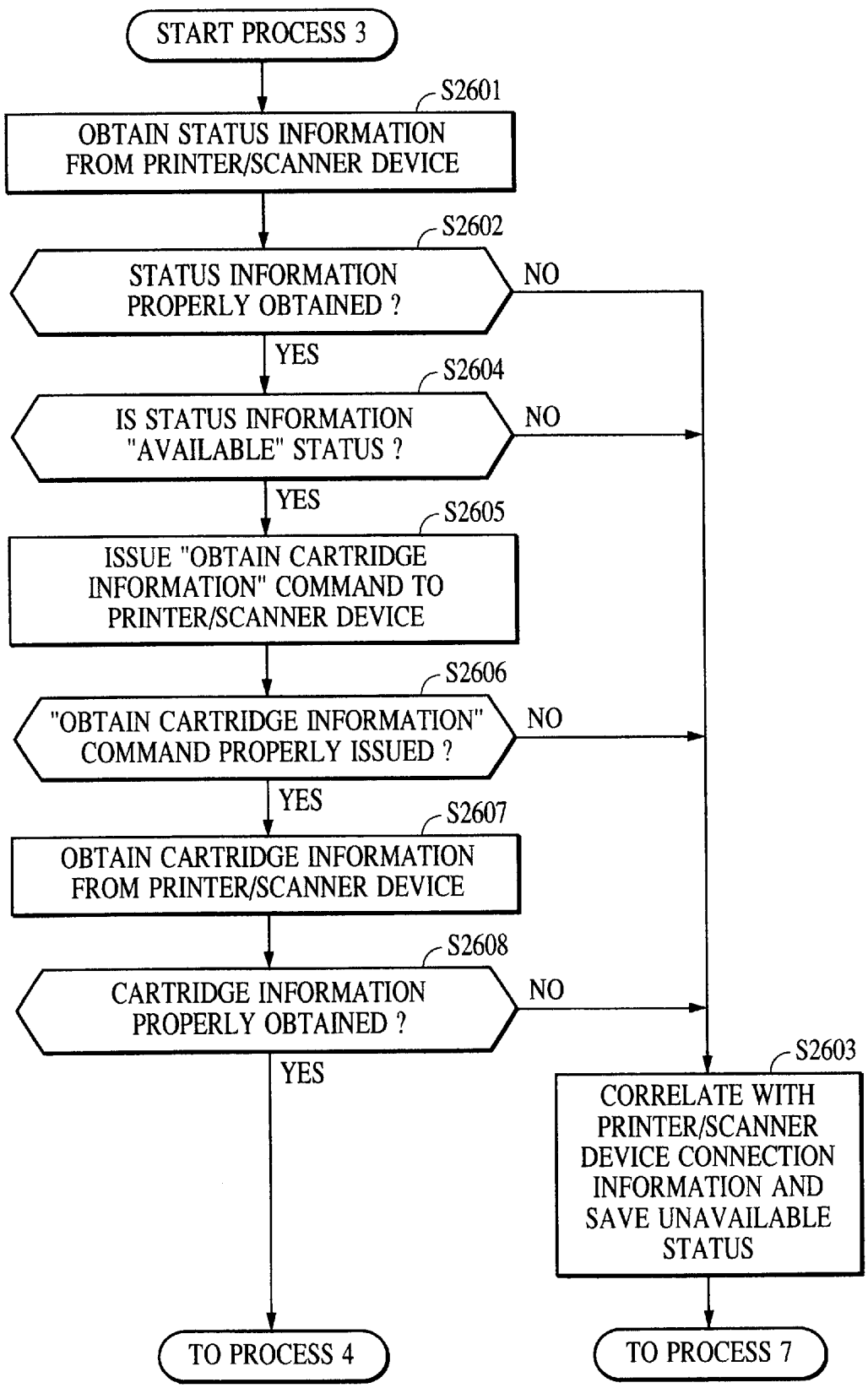
FIG. 26 is another flowchart illustrating the procedures for obtaining information for a printer/scanner device.
Figure 27:
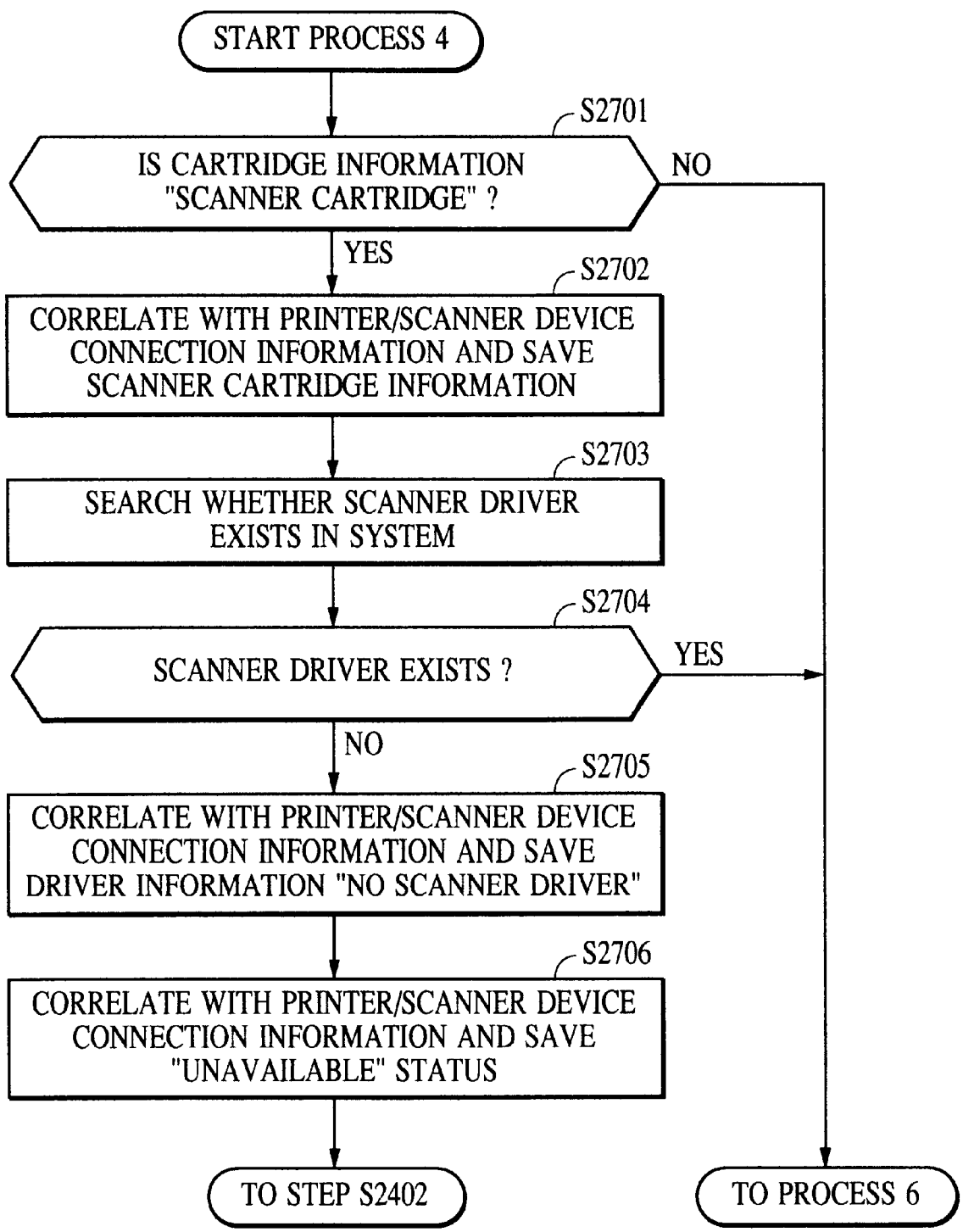
FIG. 27 is another flowchart illustrating the procedures for obtaining information for a printer/scanner device.
Figure 28:
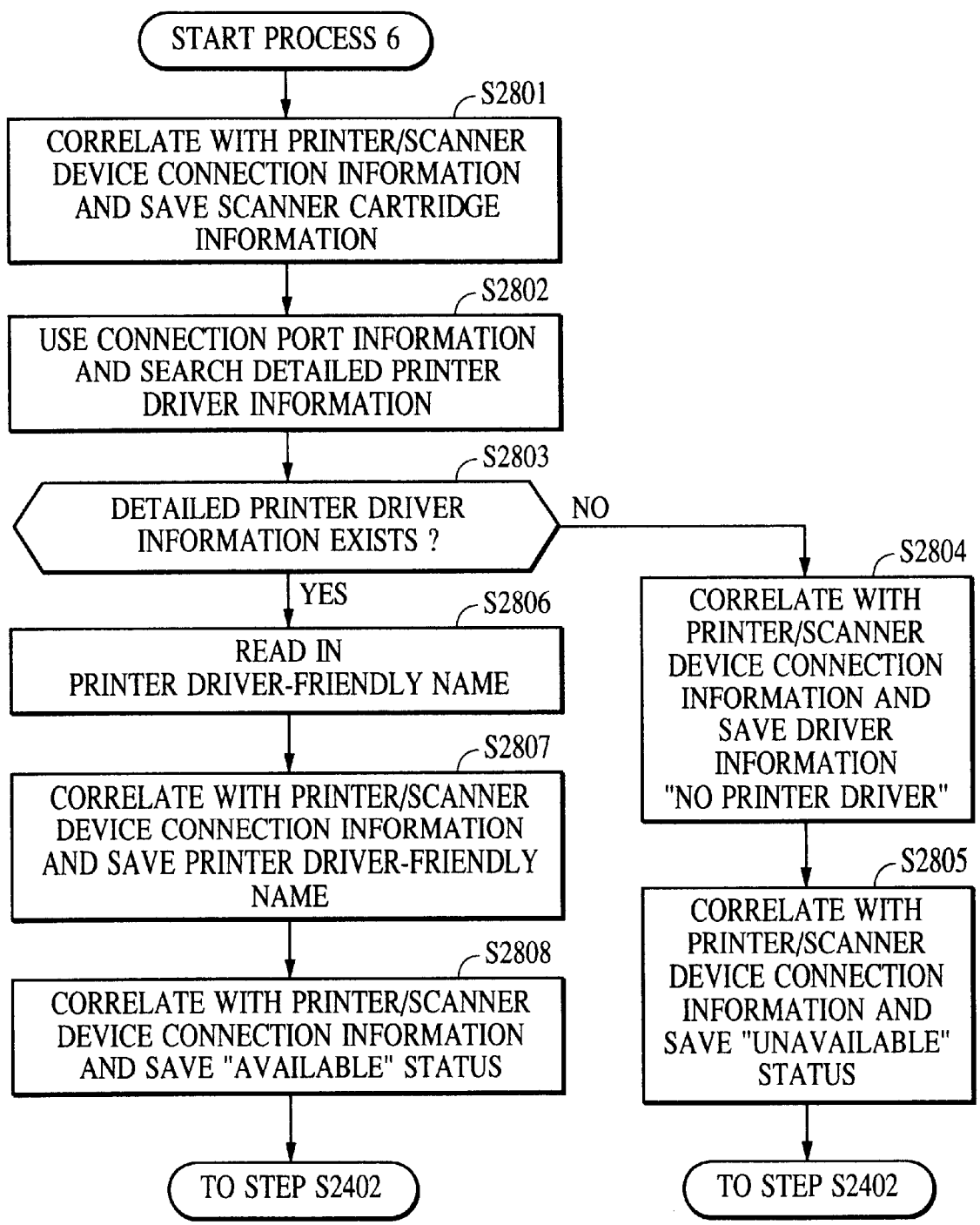
FIG. 28 is another flowchart illustrating the procedures for obtaining information for a printer/scanner device.
Figure 29:
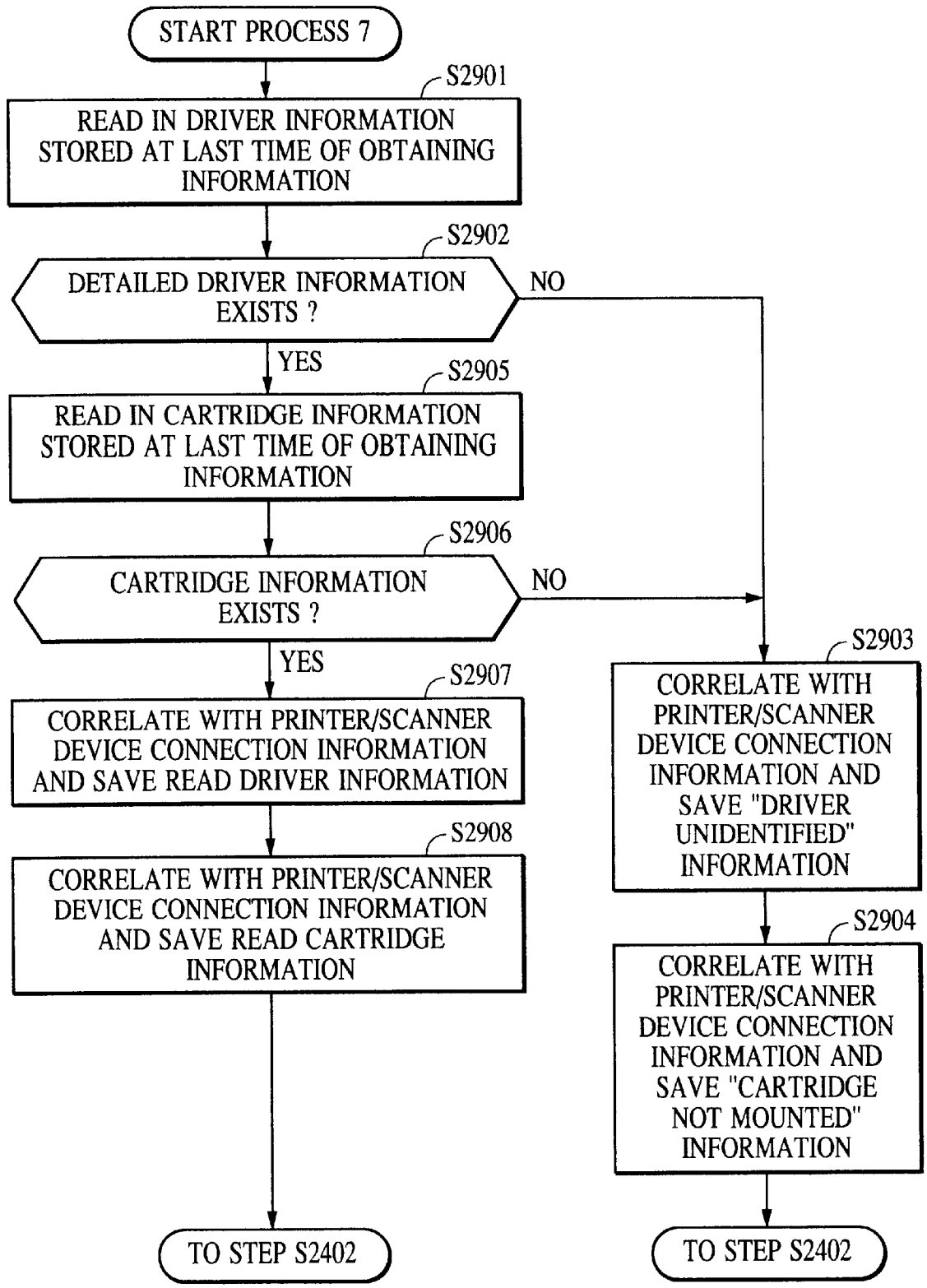
FIG. 29 is another flowchart illustrating the procedures for obtaining information for a printer/scanner device.
Figure 30:
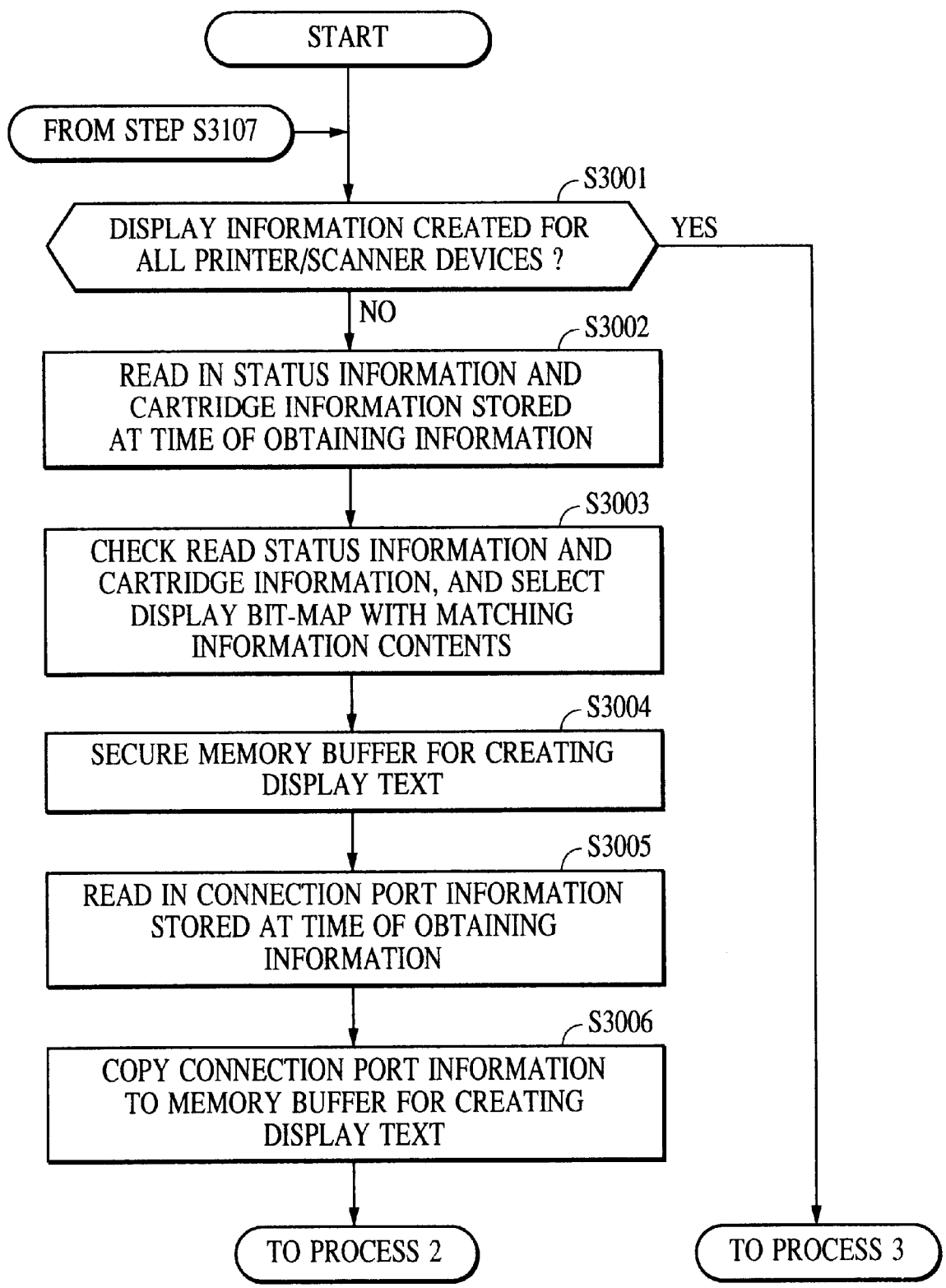
FIG. 30 is another flowchart illustrating the procedures for displaying information for printer/scanner devices.
Figure 31:
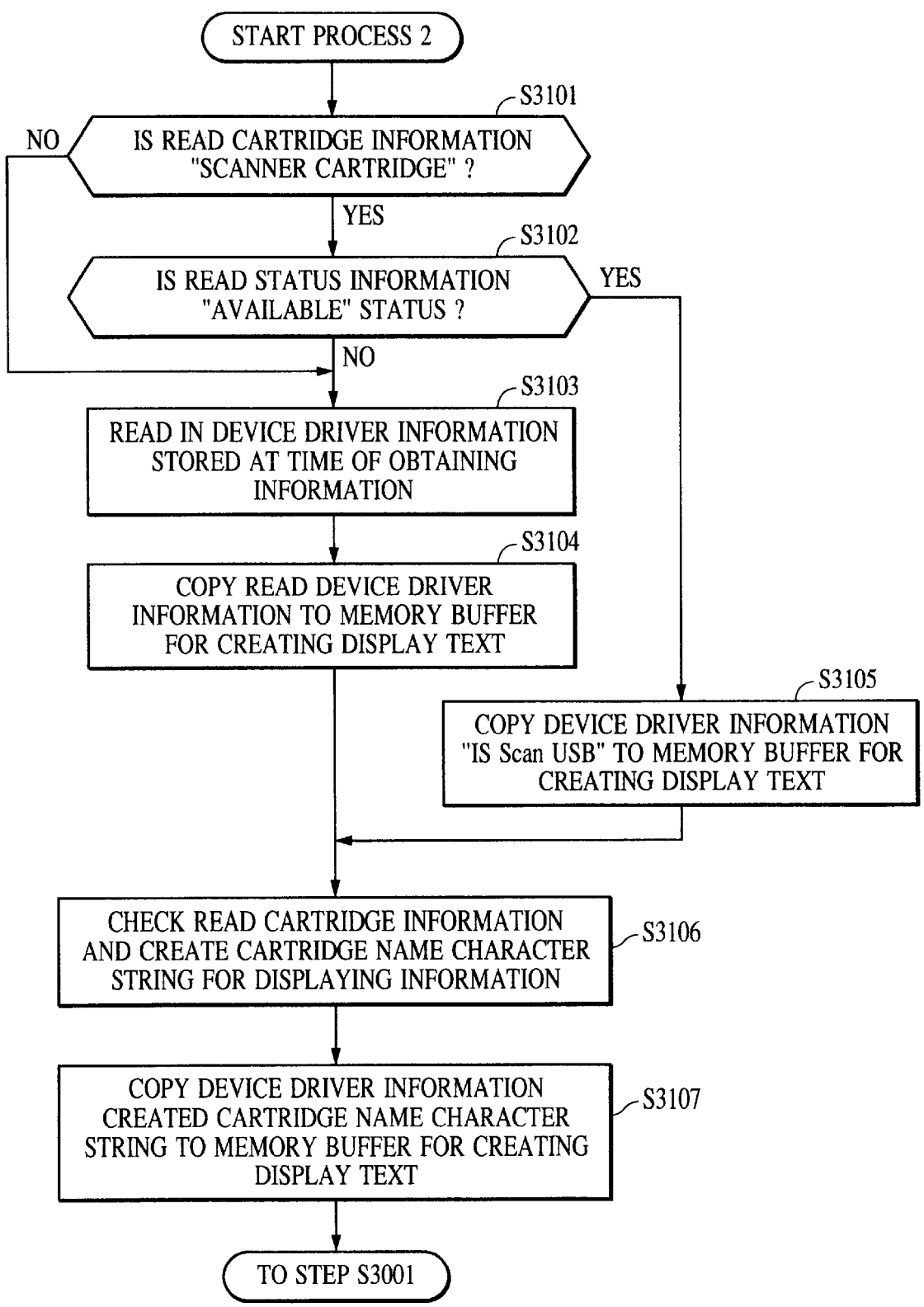
FIG. 31 is another flowchart illustrating the procedures for displaying information for printer/scanner devices.
Figure 32:
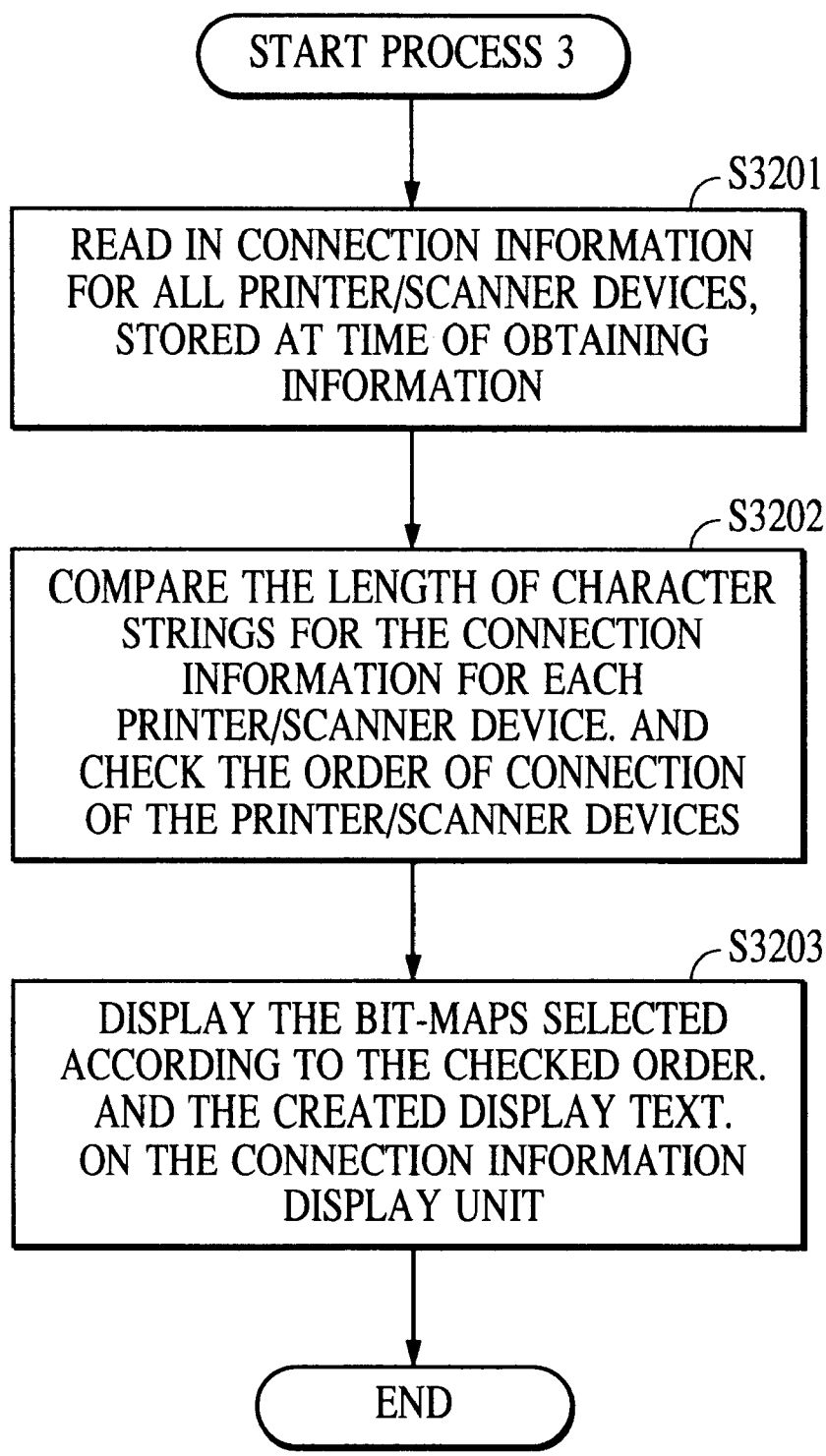
FIG. 32 is another flowchart illustrating the procedures for displaying information for printer/scanner devices.

FIG. 20 is a diagram illustrating registered information for the printer driver 1104 stored in the host computer 101 in an information processing system connected as shown in FIG. 1.

This registered information is stored in the host computer 101 in file format, only in the event that the printer driver is registered in correlation with the printer/scanner device. In the Figure, reference numeral 2001 denotes registered information for the printer driver A 1104 registered in correlation with the printer/scanner device A 102. The character string "BJC-430J USB" is a printer-friendly name for identifying the printer driver A 1104. This information is correlated with the detailed information of the printer driver shown in FIG. 19.

Reference numeral 2002 denotes the registered information for the printer driver B 1104 registered in correlation with the printer/scanner device B 103, and the character string "BJC-430J USB (copy 2)" is a printer-friendly name for identifying the printer driver B 1104. Reference numeral 2003 denotes the registered information for the printer driver C 1104 registered in correlation with the printer/scanner device C 104, and the character string "BJC-430J USB (copy 3)" is a printer-friendly name for identifying the printer driver C 1104. Reference numeral 2004 denotes the registered information for the printer driver D 1104 registered in correlation with the printer/scanner device D 105, and the character string "BJC-430J USB (copy 4)" is a printer-friendly name for identifying the printer driver D 1104.

Regarding the registered information, one printer driver is registered for one printer/scanner device. The printer-friendly name for identifying each printer driver can be changed by the user by rewriting the character string.

FIG. 21 is a list of bit-maps displayed on the USB connection status display area 1203. There are two sets of 12 types of bit-maps, one set for the selected state and one set for the non-selected state, making a total of 24 bit-maps. The difference between the bit-maps in the selected state and the non-selected state is the background color.

In the Figure, reference numeral 2101 denotes a bit-map representing the host computer 101; 2102 denotes a bit-map representing a printer/scanner device mounted with a color printer cartridge and in an available state; 2103 denotes a bit-map representing a printer/scanner device mounted with a B/W printer cartridge and in an available state; 2104 denotes a bit-map representing a printer/scanner device mounted with a scanner cartridge and in an available state; 2105 denotes a bit-map representing a printer/scanner device mounted with an unidentified cartridge and in an unavailable state; 2106 denotes a bit-map representing a printer/scanner device mounted with a color cartridge and in an unavailable state; 2107 denotes a bit-map representing a printer/scanner device mounted with a B/W cartridge and in an unavailable state; 2108 denotes a bit-map representing a printer/scanner device mounted with a scanner cartridge and in an unavailable state; 2109 denotes a bit-map representing a printer/scanner device mounted with an unidentified cartridge and in a state of not being able to obtain information; 2110 denotes a bit-map representing a printer/scanner device mounted with a color cartridge and in a state of not being able to obtain information; 2111 denotes a bit-map representing a printer/scanner device mounted with a B/W cartridge and in a state of not being able to obtain information; and 2112 denotes a bit-map representing a printer/scanner device mounted with a scanner cartridge and in a state of not being able to obtain information.

FIG. 22 is a list of text displayed on the USB connection status display area 1203. The text structure is "port name notation area (driver information notation area/cartridge information notation area)", and there are a total of eight types. Notation of the USB port name of the host computer connected to the printer/scanner device is made to the port name notation area, notation of device driver information which has been registered correlating to the printer/scanner device is made to the driver information notation area, and notation of information of the cartridge mounted to the printer/scanner device is made to the cartridge information notation area.

In the Figure, reference numeral 2201 denotes text which is displayed in the event that the printer/scanner device is available for use and a printer driver is correlated and registered, and that a printer cartridge is mounted. Here, notation of a printer-friendly name for identifying the printer driver is made to the driver information notation area, and notation of the printer cartridge name is made to the cartridge information notation area.

Reference numeral 2202 denotes text which is displayed in the event that the printer/scanner device is available for use and a printer driver is registered, and that a scanner cartridge is mounted. Here, notation of a scanner driver name is made to the driver information notation area, and notation of the scanner cartridge name is made to the cartridge information notation area.

Reference numeral 2203 denotes text which is displayed in the event that the printer/scanner device is not available for use, neither device driver information nor cartridge information can be obtained, and neither device driver information nor cartridge information has been obtained even once since the first system boot. Here, notation of "driver unidentified" is made to the driver information notation area, and notation of "cartridge unidentified" is made to the cartridge information notation area.

Reference numeral 2204 denotes text which is displayed in the event that the printer/scanner device is not available for use, neither device driver information nor cartridge information can currently be obtained, but device driver information and cartridge information has been obtained since the first system boot. Here, notation of the most recently obtained device driver name is made to the driver information notation area, and notation of the most recently obtained cartridge name is made to the cartridge information notation area.

Reference numeral 2205 denotes text which is displayed in the event that the printer/scanner device is not available for use, the printer driver has not been correlated and registered, and a printer cartridge is mounted. Here, notation of "no printer driver" is made to the driver information notation area, and notation of the printer cartridge name is made to the cartridge information notation area.

Reference numeral 2206 denotes text which is displayed in the event that the printer/scanner device is not available for use, the scanner driver has not been correlated and registered, and a scanner cartridge is mounted. Here, notation of "no scanner driver" is made to the driver information notation area, and notation of the scanner cartridge name is made to the cartridge information notation area.

Reference numeral 2207 denotes text which is displayed in the event that the printer/scanner device is not available for use, and neither device driver information nor cartridge information has been obtained since the first system boot. Here, notation of the most recently obtained device driver name is made to the driver information notation area, and notation of the most recently obtained cartridge name is made to the cartridge information notation area.

Reference numeral 2208 denotes text which is displayed in the event that the printer/scanner device is not available for use, and device driver information and cartridge information has been obtained at one point since the first system boot. Here, notation of the most recently obtained device driver name is made to the driver information notation area, and notation of the most recently obtained cartridge name is made to the cartridge information notation area.

The following is a description of the operations for obtaining information from multiple printer/scanner devices connected to a USB printer manager 1102 according to the present embodiment, with reference to FIGS. 23 through 29.

FIG. 23 is a diagram showing the information saving structure for saving information of each printer/scanner device with an information processing system according to the present embodiment, wherein a total of four printer/scanner devices 102, 103, 104, and 105, are connected to the host computer 101. One structure for saving information is provided for each printer/scanner device.

In the Figure, a device driver area 2301 has an area of 64 bytes for saving device driver information. The device driver information is saved in this area in the form of character strings. A connection port information area 2302 has an area of 16 bytes for saving connection port information. The connection port information is saved in this area in the form of character strings. A connection information area 2303 has an area of 256 bytes for saving connection information. The connection information is saved in this area in the form of character strings. A cartridge information area 2304 has an area of 4 bytes for saving cartridge information. The cartridge information is saved in this area in the form of integers between 0 to 6. The meaning of each integer is as follows:

0: Cartridge not mounted
1: B/W printer cartridge
2: Color printer cartridge 1
3: Color printer cartridge 2
4: Color printer cartridge 3
5: Color printer cartridge 4
6: Scanner cartridge A status information area 2305 has an area of 4 bytes for saving status information. The status information is saved in this area in the form of integers between 0 to 3. The meaning of each integer is as follows:

0: Unavailable
1: Available
2: Inaccessible

FIGS. 24 through 29 are flowcharts illustrating the procedures for the USB printer manager 1102 to obtain information for each of the printer/scanner devices and save the information to the structure shown in FIG. 23, in an information processing system according to the present embodiment, wherein a total of four printer/scanner devices 102, 103, 104, and 105, are connected to the host computer 101.

First, in step S2401, the program reads in the connection information (FIG. 16) of the printer/scanner devices saved in the host computer 101. With the present embodiment, connection information 1606 of the printer/scanner device B 103, connection information 1607 of the printer/scanner device C 104, connection information 1608 of the printer/scanner device D 105, and connection information 1609 of the printer/scanner device A 102, can be read in.

Next, in step S2402, judgment is made regarding whether or not there are printer/scanner devices for which information has not been obtained yet. In the event that information for all of the printer/scanner devices has been obtained, the program ends. On the other hand, in the event that there are printer/scanner devices for which information has not been obtained yet, the flow proceeds to step S2403. The process of obtaining information of the printer/scanner devices begins in step S2403.

In step S2403, detailed information for each printer/scanner device is searched for, and status information is read in. With the process of obtaining information of the printer/scanner device A 102, detailed information for the printer/scanner device A 102 shown in FIG. 17 is searched for, and the status information 1702 is read in.

Next, in step S2404, the values of the read status information are checked and judgment is passed whether or not the printer/scanner device is properly connected with a USB I/F. In the event that the status information is set to "0x00000001", judgment is passed that the printer/scanner device is properly connected, and the flow proceeds to step S2405. On the other hand, in the event that the status information is set to "0x00000000", judgment is passed that the printer/scanner device is not properly connected, the flow returns to step S2402, and checks the next printer/scanner device. With regard to the information obtaining process for the printer/scanner device A 102, the status information for the printer/scanner device A 102 is "0x00000001", so the flow proceeds to step S2405.

In step S2405, the device driver information 1701 contained in the detailed information of the printer/scanner device A 102 is read in. The registered information of the current device driver is "USB¥0003".

Then, in step S2406, the read device driver registration information is used to search correlated port connection information and read in the port connection information.

With regard to the information obtaining process for the printer/scanner device A 102, performing a search with the device driver registration information "USB¥0003" searches the port connection information of the printer/scanner device A 102 shown in FIG. 18, and the port connection information 1802 which is "USBPNR01" is read in.

Next, in step S2407, the port connection information is correlated with the connection information of the printer/scanner device and saved. With regard to the information obtaining process for the printer/scanner device A 102, the connection information "4USB&VID_04A9&PID_1000&2USB&ROOT_HUB&PCI&VEN_8086&DEV_7072&BUS_00&DEV_07&FUNC_02" is saved to the connection information area 2303 of the structure shown in FIG. 23, and the connection information "USBPRN01" of the printer/scanner device A 102 is saved to the connection port information area 2302 of the structure shown in FIG. 23.

Next, the flow proceeds to step S2501 of Process 2, and opens a connection port for accessing the printer/scanner device. This port opening process is executed by calling a port open command API with the connection port information as a parameter. With regard to the information obtaining process for a printer/scanner device, the API is called with the connection port "USBPRNA" as a parameter.

Next, step S2502 checks whether or not the connection port was opened properly or not, i.e., the execution results of the port open command API are checked. In the event that the attempt to open the port fails here, judgment is made that the printer/scanner device is being used by another software program, and the flow proceeds to step S2503. In step S2503, the inaccessible status is correlated with the connection information of the printer/scanner device and saved. With regard to the information obtaining process for the printer/scanner device A 102, an integer "2" (inaccessible status) is stored in the status information area 2305 of the structure shown in FIG. 23. The flow then proceeds to step S2901 of Process 7.

On the other hand, in the event that the attempt to open the port succeeds in step S2502, the flow proceeds to step S2504 and issues an "obtain device ID" command to the printer/scanner device. The process for issuing the device ID is executed by calling a port writing API with the "obtain device ID" command as a parameter.

Next, the flow proceeds to step S2505, and checks whether the "obtain device ID" command was issued properly or not. In the event that the attempt to issue the command fails here, judgment is made that the printer/scanner device is unavailable for some reason, and the flow proceeds to step S2508. In step S2508, the unavailable status is correlated with the connection information of the printer/scanner device and saved. With regard to the information obtaining process for the printer/scanner device A 102, an integer "0" (unavailable status) is stored in the status information area 2305 of the structure shown in FIG. 23. The flow then proceeds to step S2901 of Process 7.

On the other hand, in the event that the attempt to issue the command succeeds in step S2510, the flow proceeds to step S2506 and obtains the device ID from the printer/scanner device. As long as it is operating normally, the printer/scanner device prepares its own device ID as soon as it receives the "obtain device ID" command issued in step S2504, and this information is read out. The process of obtaining the device ID is performed by calling the port data reading API.

Next, the flow proceeds to step S2507, and checks whether the device ID was obtained properly or not. In the event that the attempt to obtain the device ID fails here, judgment is made that the printer/scanner device is unavailable for some reason, and the flow proceeds to step S2508. In step S2508, the unavailable status is correlated with the connection information of the printer/scanner device and saved. With regard to the information obtaining process for the printer/scanner device A 102, an integer "0" (unavailable status) is stored in the status information area 2305 of the structure shown in FIG. 23. The flow then proceeds to step S2901 of Process 7.

On the other hand, in the event that the attempt to obtain the device ID succeeds in step S2507, the flow proceeds to step S2509 and issues an "obtain status" command to the printer/scanner device. The process of issuing the "obtain status" command is performed by calling the port data writing API.

Next, the flow proceeds to step S2510, and checks whether the "obtain status" command was issued properly or not. In the event that the attempt to issue the command fails here, judgment is made that the printer/scanner device is unavailable for some reason, and the flow proceeds to step S2508. In step S2508, the unavailable status is correlated with the connection information of the printer/scanner device and saved. With regard to the information obtaining process for the printer/scanner device A 102, an integer "0" (unavailable status) is stored in the status information area 2305 of the structure shown in FIG. 23. The flow then proceeds to step S2901 of Process 7.

On the other hand, in the event that the attempt to issue the command succeeds in step S2501, the flow proceeds to step S2601 of Process 3. In step S2601, the flow obtains the status information from the printer/scanner device. As long as it is operating normally, the printer/scanner device prepares its own status information as soon as it receives the "obtain status" command issued in step S2509, and this information is read out. The process of obtaining the device ID is performed using the port data reading API.

Next, the flow proceeds to step S2602, and checks whether the status information was obtained properly or not. In the event that the attempt to obtain the status information fails here, judgment is made that the printer/scanner device is unavailable for some reason, and the flow proceeds to step S2603. In step S2603, the unavailable status is correlated with the connection information of the printer/scanner device and saved. With regard to the information obtaining process for the printer/scanner device A 102, an integer "0" (unavailable status) is stored in the status information area 2305 of the structure shown in FIG. 23. The flow then proceeds to step S2901 of Process 7.

On the other hand, in the event that the attempt to obtain the status information succeeds in step S2602, the flow proceeds to step S2604 and judges whether or not the obtained status information is a usable status or not. In the event that the obtained status information is not a usable status, judgment is made that the printer/scanner device is unavailable for some reason, and the flow proceeds to step S2603. In step S2603, the unavailable status is correlated with the connection information of the printer/scanner device and saved. With regard to the information obtaining process for the printer/scanner device A 102, an integer "0" (unavailable status) is stored in the status information area 2305 of the structure shown in FIG. 23. The flow then proceeds to step S2901 of Process 7.

On the other hand, in the event that the status information obtained in step S2604 is a usable status, judgment is made that the printer/scanner device is available, the flow proceeds to step S2605, and issues an "obtain cartridge information" command to the printer/scanner device. The process of issuing the "obtain cartridge information" command is performed by calling the port data writing API with the "obtain cartridge information" command as a parameter.

Next, the flow proceeds to step S2606, and checks whether the "obtain cartridge information" command was issued properly or not. In the event that the attempt to issue the command fails here, judgment is made that the printer/scanner device is unavailable for some reason, and the flow proceeds to step S2603.

In step S2603, the unavailable status is correlated with the connection information of the printer/scanner device and saved. With regard to the information obtaining process for the printer/scanner device A 102, an integer "0" (unavailable status) is stored in the status information area 2305 of the structure shown in FIG. 23. The flow then proceeds to step S2901 of Process 7.

On the other hand, in the event that the attempt to issue the command succeeds in step S2606, the flow proceeds to step S2607 and obtains the cartridge information from the printer/scanner device. As long as it is operating normally, the printer/scanner device prepares its own status information as soon as it receives the "obtain cartridge information" command issued in step S2605, and this information is read out. The process of obtaining the device ID is performed using the port data reading API.

Next, the flow proceeds to step S2608, and checks whether the cartridge information was obtained properly or not. In the event that the attempt to obtain the cartridge information fails here, judgment is made that the printer/scanner device is unavailable for some reason, and the flow proceeds to step S2603. In step S2603, the unavailable status is correlated with the connection information of the printer/scanner device and saved. With regard to the information obtaining process for the printer/scanner device A 102, an integer "0" (unavailable status) is stored in the status information area 2305 of the structure shown in FIG. 23. The flow then proceeds to step S2901 of Process 7.

On the other hand, in the event that the attempt to obtain the cartridge information succeeds in step S2608, the flow proceeds to step S2701. In step S2701, the flow judges whether or not the obtained cartridge information is a "scanner cartridge" or not. In the event that the obtained cartridge information is not a "scanner cartridge", the flow proceeds to step S2801 in Process 6. On the other hand, in the event that the obtained cartridge information is a "scanner cartridge", the flow proceeds to step S2702.

In step S2702, the cartridge information is correlated with the connection information of the printer/scanner device and saved. With regard to the information obtaining process for the printer/scanner device A 102, an integer "6" (scanner cartridge) is stored in the cartridge information area 2304 of the structure shown in FIG. 23. The flow then proceeds to step S2703.

In step S2703, judgment is made of whether or not a scanner driver exists in the system host computer 101. The process of checking whether or not the scanner driver 1103 exists is performed by searching for whether the main execution file of the scanner driver 1103 exists on the hard disk drive of the host computer 101.

Next, in step S2704, in the event that the main execution file of the scanner driver 1103 exists, judgment is made that the scanner driver exists, and the flow proceeds to step S2801 in Process 6. On the other hand, in the event that the main execution file of the scanner driver 1103 does not exist, judgment is made that a scanner driver does not exist, and the flow proceeds to step S2705.

In step S2705, the driver information "no scanner driver" is correlated with the connection information of the printer/scanner device and saved. With regard to the information obtaining process for the printer/scanner device A 102, a text string "no scanner driver" is stored in the device driver area 2302 of the structure shown in FIG. 23. The flow then returns to step S2402, and starts the process of obtaining information for the next printer/scanner device.

On the other hand, in the event that the flow has proceeded from step S2701 or step S2704 to Process 6, first, in step S2801, the printer cartridge information is correlated with the connection information of the printer/scanner device and saved. The cartridge information to be saved here is the cartridge information obtained in step S2609. With regard to the information obtaining process for the printer/scanner device A 102, a value consisting of one of the integers "1", "2", "3", "4", or "5" (the value to be saved changes according to the type of printer cartridge mounted to the printer/scanner device A 102) is stored in the cartridge information area 2304 of the structure shown in FIG. 23. The flow then proceeds to step S2802.

In step S2802, the connection port information read in step S2406 is used to search for printer driver detailed information. With regard to the information obtaining process for the printer/scanner device A 102, port connection information "USBPRN01" is used to search for the printer driver detailed information shown in FIG. 19.

Next, in step S2803, judgment is made of whether or not printer driver detailed information exists. The process of searching for printer driver detailed information is performed by searching information files saved in the host computer 101 with the port connection information as the search key. Now, in the event that the printer driver 1104 detailed information does not exist, judgment is made that a registered printer driver correlated to the printer/scanner device for which information is currently being obtained does not exist in the system, and the flow proceeds to step S2804.

In step S2804, the driver information "no printer driver" is correlated with the connection information of the printer/scanner device and saved. With regard to the information obtaining process for the printer/scanner device A 102, a text string "no printer driver" is stored in the device driver area 2301 of the structure shown in FIG. 23. The flow then returns to step S2402, and starts the process of obtaining information for the next printer/scanner device.

On the other hand, in the event that printer driver detailed information exists in step S2803, judgment is made that a printer driver correlated to the printer/scanner device for which information is currently being obtained is registered and exists in the system, and the flow proceeds to step S2805. In step S2805, the printer driver friendly name contained in the printer driver detailed information is read in.

Next, in step S2806, the printer driver friendly name is correlated with the connection information of the printer/scanner device and saved. With regard to the information obtaining process for the printer/scanner device A 102, the printer driver friendly name "BJC-430J USB" read into the device driver area 2301 of the structure shown in FIG. 23 is saved as a text string (step S2807). Next, in step S2808, the available status is correlated with the connection information of the printer/scanner device and saved (selecting means). Subsequently, the flow returns to step S2402, and starts the process of obtaining information for the next printer/scanner device.

The following is a description regarding the case wherein the flow proceeds from step S2503, S2508, or S2603 to Process 7. First, in step S2901, the driver information which has been correlated with the connection information of the printer/scanner device at the previous obtaining of information is read in. Then, in step S2902, judgment is made whether or not data exists in the driver information saved at the previous obtaining of information. In the event that data does not exist in the driver information, the flow proceeds to step S2903, the driver information is correlated with the connection information of the printer/scanner device, and the driver information "driver unidentified" is saved as a character string. With regard to the information obtaining process for the printer/scanner device A 102, a text string "driver unidentified" is stored in the device driver area 2301 of the structure shown in FIG. 23. The flow then proceeds to step S2904, correlates "cartridge not mounted" information with the connection information of the printer/scanner device, and saves this as an integer. With regard to the information obtaining process for the printer/scanner device A 102, an integer "0" is stored in the cartridge information area 2304 of the structure shown in FIG. 23. Subsequently, the flow returns to step S2402, and starts the process of obtaining information for the next printer/scanner device. This process is repeated unit obtaining of information for all printer/scanner devices existing in the system is completed.

On the other hand, in step S2902, in the event that data exists in the driver information, the flow proceeds to step S2905, and reads cartridge information correlated with the connection information of the printer/scanner device from the previous obtaining of information and saved.

Then, in step S2906, judgment is made whether or not data exists in the cartridge information saved at the previous obtaining of information. In the event that data does not exist in the cartridge information, the flow proceeds to step S2903, the driver information is correlated with the connection information of the printer/scanner device, and the driver information "driver unidentified" is saved as a character string. With regard to the information obtaining process for the printer/scanner device A 102, a text string "driver unidentified" is stored in the device driver area 2301 of the structure shown in FIG. 23. The flow then proceeds to step S2904, correlates "cartridge not mounted" information with the connection information of the printer/scanner device, and saves this as an integer. With regard to the information obtaining process for the printer/scanner device A 102, an integer "0" is stored in the cartridge information area 2304 of the structure shown in FIG. 23. Subsequently, the flow returns to step S2402, and starts the process of obtaining information for the next printer/scanner device. This process is repeated unit obtaining of information for all printer/scanner devices existing in the system is completed.

On the other hand, in step S2906, in the event that data exists in the cartridge information, the flow proceeds to step S2907, and correlates the read and saved driver information with the connection information of the printer/scanner device and saves it. With regard to the information obtaining process for the printer/scanner device A 102, the read driver information is stored as a character string in the device driver area 2301 of the structure shown in FIG. 23.

Next, the flow proceeds to step S2908, and correlates the read and saved cartridge information with the connection information of the printer/scanner device and saves it. With regard to the information obtaining process for the printer/scanner device A 102, the read cartridge information is stored as an integer in the cartridge information area 2304 of the structure shown in FIG. 23.

Subsequently, the flow returns to step S2402, and starts the process of obtaining information for the next printer/ scanner device. This process is repeated unit obtaining of information for all printer/scanner devices existing in the system is completed.

Also, with the present embodiment, the above information obtaining process is repeated once every six seconds when the system is running. Two takes of obtained information are stored in the host computer. In other words, the information obtained at the immediately prior information obtaining process, and the information obtained at the current information obtaining process, are saved.

When executing the above information obtaining process, the contents of the data saving structure changes according to the state of the printer/scanner device. In the present embodiment, there are nine patterns of change in the contents of the data saving structure. These are described next.

Pattern 1

A case wherein the printer/scanner device is inaccessible, and there is no driver information or head information saved in the past (the "xx" portion of the character string depends on the connection status).

Device driver area:
   Character string "device unidentified"
Connection port information area:
   Character string "USBPRNxx"
Connection information area:
   Character string "xxxxxxxxxxx"
Cartridge information area:
   Integer "0"
Status information area
   Integer "2"

Pattern 2

A case wherein the printer/scanner device is inaccessible, and there is driver information and head information saved in the past (the "xx" portion of the character string depends on the connection status).

Device driver area:
   Character string for saved driver information
Connection port information area:
   Character string "USBPRNxx"
Connection information area:
   Character string "xxxxxxxxxxx"
Cartridge information area:
   Integer for saved cartridge information
Status information area
   Integer "2"

Pattern 3

A case wherein the printer/scanner device is unavailable, and there is no driver information or head information saved in the past (the "xx" portion of the character string depends on the connection status).

Device driver area:
   Character string "device unidentified"
Connection port information area:
   Character string "USBPRNxx"
Connection information area:
   Character string "xxxxxxxxxxx"
Cartridge information area:
   Integer "0"
Status information area
   Integer "0"

Pattern 4

A case wherein the printer/scanner device is unavailable, and there is driver information and head information saved in the past (the "xx" portion of the character string depends on the connection status).

Device driver area:
   Character string for saved driver information
Connection port information area:
   Character string "USBPRNxx"
Connection information area:
   Character string "xxxxxxxxxxx"
Cartridge information area:
   Integer for saved cartridge information
Status information area
   Integer "0"

Pattern 5

A case wherein the printer/scanner device is available, the mounted cartridge is a printer cartridge, and the printer driver is registered in the system (the "xx" portion of the character string depends on the connection status).

Device driver area:
   Character string for printer driver friendly name
Connection port information area:
   Character string "USBPRNxx"
Connection information area:
   Character string "xxxxxxxxxxx"
Cartridge information area:
   Integer for obtained printer cartridge information
Status information area
   Integer "1"

Pattern 6

A case wherein the printer/scanner device is available, the mounted cartridge is a printer cartridge, and the printer driver is not registered in the system (the "xx" portion of the character string depends on the connection status).

Device driver area:
   Character string "no printer driver"
Connection port information area:
   Character string "USBPRNxx"
Connection information area:
   string "xxxxxxxxxxx"
Cartridge information area:
   Integer for obtained printer cartridge information
Status information area
   Integer "0"

Pattern 7

A case wherein the printer/scanner device is available, the mounted cartridge is a scanner cartridge, and the printer driver is registered in the system (the "xx" portion of the character string depends on the connection status).

Device driver area:
   Character string for printer driver friendly name
Connection port information area:
   Character string "USBPRNxx"
Connection information area:
   Character string "xxxxxxxxxxx"
Cartridge information area:
   Integer "6"
Status information area
   Integer "1"

Pattern 8

A case wherein the printer/scanner device is available, the mounted cartridge is a scanner cartridge, and the printer driver is not registered in the system (the "xx" portion of the character string depends on the connection status).

Device driver area:
  Character string "no printer driver"
Connection port information area:
  Character string "USBPRNxx"
Connection information area:
  Character string "xxxxxxxxxxx"
Cartridge information area:
  Integer "6"
Status information area
  Integer "1"
Pattern 9

A case wherein the printer/scanner device is available, the mounted cartridge is a scanner cartridge, and a scanner driver does not exist in the system (the "xx" portion of the character string depends on the connection status).
Device driver area:
  Character string "no scanner driver"
Connection port information area:
  Character string "USBPRNxx"
Connection information area:
  Character string "xxxxxxxxxxx"
Cartridge information area:
  Integer "6"
Status information area
  Integer "0"

The following is a description of the process of the USB printer manager according to the present embodiment displaying the information of the multiple printer/scanner devices, with reference to FIGS. 30 through 33.

FIGS. 30 through 33 are flowcharts illustrating the procedures for the USB printer manager to display information for the printer/scanner devices obtained with the above processes according to the detailed describing diagram of the USB connection status display area shown in FIG. 13, in an information processing system according to the present embodiment, wherein a total of four printer/scanner devices 102, 103, 104, and 105, are connected to the host computer 101.

First, in step S3001, the program judges whether or not display information for all printer/scanner devices has been created or not. In the event that display information has been created for all printer/scanner devices, the flow proceeds to process 3, and checks the order that the printer/scanner devices are connected in. In the event that display information for all printer/scanner devices has not been completed, the flow proceeds to step S3002.

In step S3002, the status information and cartridge information for the printer/scanner devices saved in the above information obtaining processes is read in. Next, the status information and cartridge information read in step S3003 are checked, and a bit-map that the contents agree with is selected from the list of display bit-maps shown in FIG. 21. For example, in the event that the status information is "available", and the cartridge information is "color printer cartridge", bit-map 2102 is selected from FIG. 21.

Next, the flow proceeds to step S3004, and the program secures memory buffer for creating display text. Then, in step S3005, the connection port information for the printer/scanner device saved in the above information obtaining process is read in, and in step S3006, the connection port information read in step S3005 is copied to the memory buffer created for creating display text in step S3004, and is saved. Subsequently, the flow proceeds to step S3101 in Process 2.

In step S3101, the flow checks whether the cartridge information read in step S3002 is a scanner cartridge. In the event that the read cartridge information is not a scanner cartridge, the flow proceeds to step S3103. On the other hand, in the event that the read cartridge information is a scanner cartridge, the flow proceeds to step S3102.

In step S3102, the flow checks whether the status information read in step S3002 is available status. In the event that the read status information is not available status, the flow proceeds to step S3103. On the other hand, in the event that the read status information is available status, the flow proceeds to step S3105, and copies and saves the scanner driver name character string "IS Scan USB" as device driver information to the memory buffer for creating display text created in step S3004. Then, the flow proceeds to step S3106.

Next, description will be made regarding a case wherein the flow proceeds from step S3101 or step S3102 to step S3103. In step S3103, the device driver information for printer/scanner devices which had been saved at the above obtaining of information is read in. Then, in step S3104, the device driver information read in step S3103 is copied to the memory buffer for creating display text in step S3004, and is saved. Subsequently, the flow proceeds to step S3106.

In step S3106, the cartridge information read in step S3002 is checked, and a cartridge name character string for displaying information is created.

That is, in the event that the cartridge information is the integer "0" (cartridge not mounted), a cartridge name character string "cartridge unidentified" is created; in the event that the cartridge information is the integer "1" (B/W printer cartridge), a cartridge name character string "B/W BJ cartridge" is created; in the event that the cartridge information is the integer "2" (color printer cartridge 1), a cartridge name character string "color BJ cartridge 1" is created; in the event that the cartridge information is the integer "3" (color printer cartridge 2), a cartridge name character string "color BJ cartridge 2" is created; in the event that the cartridge information is the integer "4" (color printer cartridge 3), a cartridge name character string "color BJ cartridge 3" is created; in the event that the cartridge information is the integer "5" (color printer cartridge 4), a cartridge name character string "color BJ cartridge 4" is created; and in the event that the cartridge information is the integer "6" (scanner cartridge), a cartridge name character string "scanner cartridge" is created.

Then, in step S3107, the cartridge name character string created in step S3106 is copied to the memory buffer for creating display text in step S3004, and is saved. Subsequently, the flow returns to step S3001, and creates the display information for the next printer/scanner device.

The following is a description of a case wherein creation of the display information for all printer/scanner devices has been completed in step S3001.

In step S3201 of Process 3, the program reads in the connection information for all printer/scanner devices saved in the above information obtaining processes. In step S3202, the length of the character strings of the connection information for the printer/scanner devices read in step S3201 is compared, thereby checking the order of connection of the printer/scanner devices. Next, in step S3203, the information for each printer/scanner device is displayed on the USB connection status 1203 shown in FIG. 12 along with the bit-maps selected in step S3003 and display text saved in the buffer memory, in the order of connection checked from the information read in step S3002.

Figure 33:
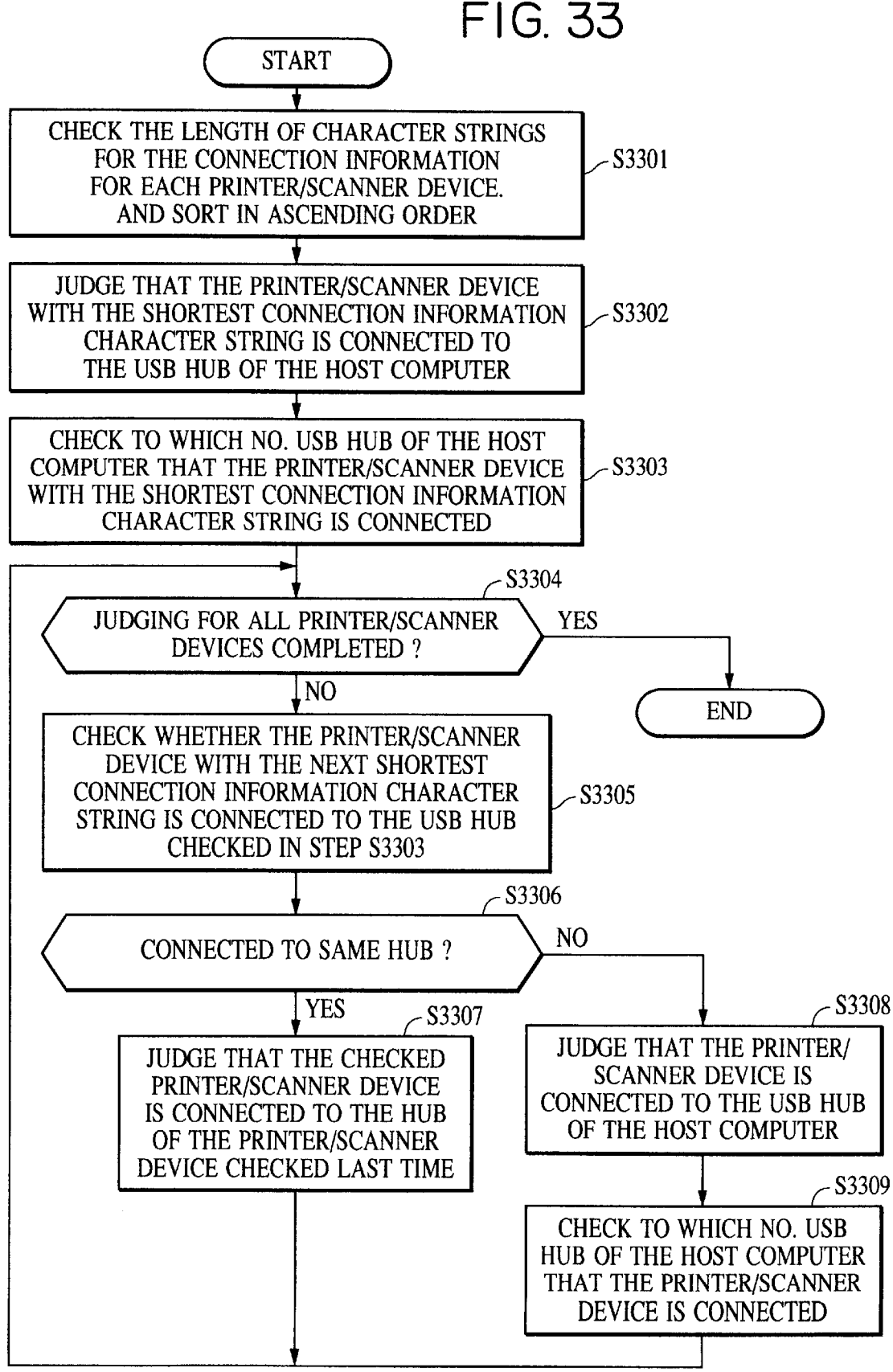
FIG. 33 is another flowchart illustrating the procedures for displaying information for printer/scanner devices.

The following is a detailed description of the process of detecting the order of the printer/scanner devices in step S3202, with reference to FIG. 33.

In step S3301 of FIG. 33, the program checks the length of the character strings of the connection information for each printer/scanner device read in step S3201, and sorts these in ascending order.

In the present embodiment, the connection information shown in FIG. 16 is obtained, yielding the following:

Connection information for printer/scanner device A 102: "4USB&VID_04A9&PID_1000&1USB&ROOT_HUB&PCI&VEN_8086&DEV_7020&BUS_00&DEV_07&FUNC_02"

Connection information for printer/scanner device B 103: "4USB&VID_04A9&PID_1000&2USB&ROOT_HUB&PCI&VEN_8086&DEV_7020&BUS_00&DEV_07&FUNC_02"

Connection information for printer/scanner device C 104: "4USB&VID_04A9&PID_1000&1USB&VID_04A9&PID_1000&2USB&ROOT_HUB&PCI&VEN_8086&DEV_7020&BUS_00&DEV_07&FUNC_02"

Connection information for printer/scanner device D 105: "4USB&VID_04A9&PID_1000&1USB&PID_04A9&PID_1000&1USB&VID_0 4A9&PID_1000&2USB&ROOT_HUB&PCI&VEN_8086&DEV_7020&BUS_00&D EV_07&FUNC_02"

Accordingly, sorting the printer/scanner devices in ascending order or the length of the character strings yields the order of: printer/scanner device A 102, printer/scanner device B 103, printer/scanner device C 104, and printer/scanner device D 105. However, the length of the character string of the printer/scanner device A 102 and printer/scanner device B 103 are the same, and thus these two devices are judged to be in the same order.

Next, the flow proceeds to step S3302, and judgment is made that the printer/scanner device with the shortest connection information character string is connected to the USB hub of the host computer.

With the present embodiment, the length of the character string of the printer/scanner device A 102 and printer/scanner device B 103 are the same are the shortest, so judgment is made that these two devices are connected to the USB hub of the host computer 101.

Next, the flow proceeds to step S3303, and judgment is made regarding to which No. USB hub of the host computer 101 the printer/scanner device with the shortest connection information character string is connected to. Specifically, the fact that the connection information of a certain printer/scanner device always contains connection information of the hub to which the that printer/scanner device is connected, is used.

For example, the connection information for the printer/scanner device A 102 "4USB&VID_04A9&PID_1000&1USB&ROOT_HUB&PCI&VEN_8086&DEV_7020&BUS_00&DEV_07&FUNC_02" contains the connection information for the USB hub of the host computer 101 to which the printer/scanner device A 102 is connected, i.e., "PCI&VEN_8086&DEV_7020&BUS_00&DEV_07&FUNC_02".

Then, it can be judged by the character string "1USB" in the connection information for the printer/scanner device A 102 "4USB&VID_04A9&PID_1000&1USB&ROOT_HUB&PCI . . . " that the printer/scanner device A 102 is connected to the USB hub 1, of the two USB hubs that the host computer 101 has.

In the same manner, the connection information for the printer/scanner device B 103 "4USB&VID_04A9&PID_1000&2USB&ROOT_HUB&PCI&VEN_8086&DEV_7020&BUS_00&DEV_07&FUNC_02" contains the connection information for the USB hub of the host computer 101 to which the printer/scanner device B 103 is connected, i.e., "PCI&VEN_8086&DEV_7020&BUS_00&DEV_07&FUNC_02".

Then, it can be judged by the character string "2USB" in the connection information for the printer/scanner device A 102 "4USB&VID_04A9&PID_1000&2USB&ROOT_HUB&PCI . . . " that the printer/scanner device B 103 is connected to the USB hub 2, of the two USB hubs that the host computer has.

Then, the flow proceeds to step S3304, and judges whether or not judging of all printer/scanner devices has been completed. In the event that all have been judged, the order detecting process ends. On the other hand, in the event that not all have been judged, the flow proceeds to step S3305. In step S3305, judgment is made regarding whether or not the printer/scanner device with the next shortest character string is connected to the USB hubs checked in step S3303.

With the present embodiment, the connection information of the printer/scanner device C 104 is the next shortest, and judgment is made regarding to which No. USB hub of the host computer 101 the printer/scanner device C 104 is connected to.

Specifically, the connection information for the printer/scanner device C 104 "4USB&VID_04A9&PID_1000&1USB&VID_04A9&PID_1000&2USB&ROOT_HUB&PCI&VEN_8086&DEV_7020&BUS_00&DEV_07&FUNC_02" is checked, and the character string "&ROOT HUB" is detected.

Next, the four characters preceding the character string "&ROOT_HUB" are "2USB". This indicates that the printer/scanner device C 103 is connected to the USB hub 2 of the host computer.

Next, the flow proceeds to step S3306, and judgment is made regarding whether or not the USB hub detected in step S3302 and the USB hub detected in step S3305 are the same USB hub. In the event that these are the same USB hub, the flow proceeds to step S3307, and in the event that these are different USB hubs, the flow proceeds to step S3308.

With the present embodiment, the USB hub of the host computer 101 to which the printer/scanner device C 104 is connected is the same USB hub of the host computer 101 to which the printer/scanner device B 103 is connected (i.e., USB hub 2), so the flow proceeds to step S3307.

In step S3307, judgment is made that the printer/scanner device checked in step S3305 is connected to the same USB hub of the host computer, and is connected to the hub of the printer/scanner device detected in step S3302 or the preceding step S3305.

Here, the printer/scanner device checked in step S3305 is the printer/scanner device C 104, which is connected to the same USB hub of the host computer 101, and the printer/scanner device detected in step S3302 or the preceding step S3305 is the printer/scanner device B 103, so judgment is made that the printer/scanner device C 104 is connected to the printer/scanner device B 103. Subsequently, the flow returns to step S3304, and judgment of the next printer/scanner device is performed.

Now, the printer/scanner device to be checked in the next step S3305 is the printer/scanner device D 105. The printer/scanner device D 105 is connected to the USB hub 2 of the host computer 101. The printer/scanner device connected to the same host computer 101 and detected in step S3302 or the preceding step S3305 is the printer/scanner device C 104, so judgment is made that the printer/scanner device D 105 is connected to the printer/scanner device C 104.

Description will now be made regarding a case wherein the USB hub detected in step S3302 and the USB hub detected in step S3305 are not the same in step S3306.

In step S3308, judgment is made that the printer/scanner device detected in step S3305 is connected to the USB hub of the host computer. Next, in step S3309, checking is performed regarding which No. USB hub of the host computer the printer/scanner device detected in step S3305 is connected to. The flow then returns to step S3304, and judgment of the next printer/scanner device is performed.

Next, description will be made with reference to FIG. 34, regarding the process of the printer manager issuing an "execute individual identification process" command to a certain printer/scanner device connected to the system, in the event that the user double-clicks on a bit-map representing the state of a certain printer/scanner device within the overhead-view USB connection status display area 1203 shown in FIG. 12.

Figure 34:
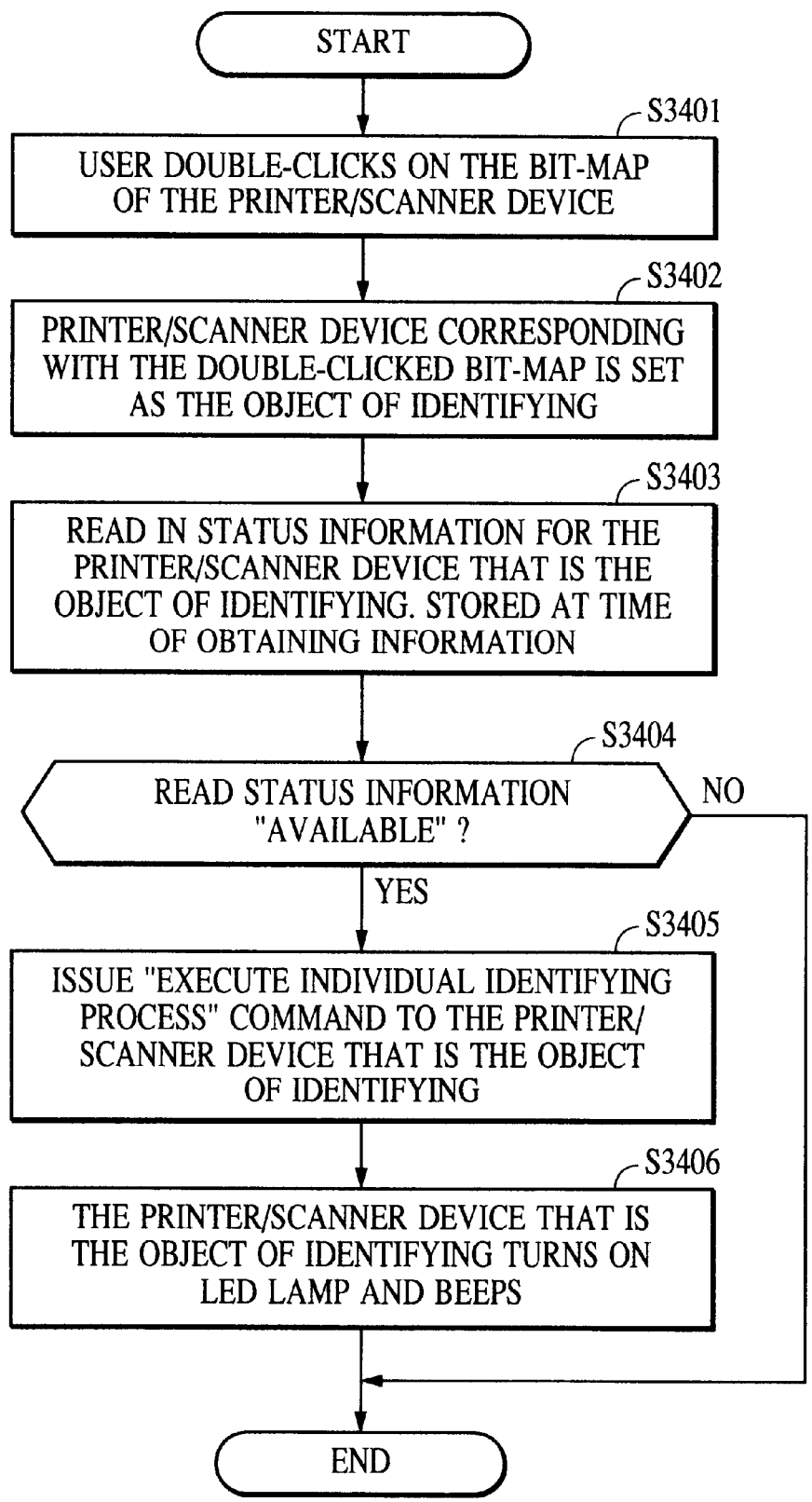
FIG. 34 is another flowchart illustrating the procedures for displaying information for printer/scanner devices.

FIG. 34 is a flowchart illustrating the procedures for the USB printer manager 1102 to issue an "execute individual identification process" command to a certain printer/scanner device connected to the system, in an information processing system according to the present embodiment, wherein a total of four printer/scanner devices 102, 103, 104, and 105, are connected to the host computer 101.

First, in step S3401, the user double-clicks on a bit-map representing the state of a certain printer/scanner device within the overhead-view USB connection status display area 1203. The program then detects the double-clicked bit-map in step S3402, and specifies the certain printer/scanner device corresponding to the bit-map as the printer/scanner device to be the object of identification.

Next, in step S3403, the status information of the printer/scanner device to be the object of identification that had been saved during the process of obtaining information, is read in.

The flow then proceeds to step S3404, and checks whether or not the status information read in step S3403 indicates an available status for the device. Now, in the event that the read status information is not an available status, the process ends. On the other hand, in the event that the read status information is an available status, the flow proceeds to step S3405.

In step S3405, an "execute individual identification process" command is issued to the printer/scanner device which is the object of identification. The "execute individual identification process" command is comprised of a combination of the following three commands: i.e., 1. A "generate beep" command
2. A "light LED" command
3. A "wait" command Here, the "generate beep" command is a command to cause an unshown audio device such as a buzzer provided to each printer/scanner device to emit a beep, the "light LED" command is a command to light at least one of the power display LED and error display LED provided to the panel unit 601 of the printer/scanner device, and the "wait" command is a command to stop for the duration of the beep or the time specified for lighting the LED.

The flow then proceeds to step S3406, and the printer/scanner device which has received the "execute individual identification process" command lights LED(s) and emits a beep.

For example, in the event that the "execute individual identification process" command issued in step S3405 is as follows in step S3406, the printer/scanner device to be the object of identification lights LED(s) and emits beeps in a 3-3-7 rhythm.

Light LED command; Emit beep command; 500 ms wait command;
Light LED command; Emit beep command; 500 ms wait command;
Light LED command; Emit beep command; 1000 ms wait command;
Light LED command; Emit beep command; 500 ms wait command;
Light LED command; Emit beep command; 500 ms wait command;
Light LED command; Emit beep command; 1000 ms wait command;
Light LED command; Emit beep command; 500 ms wait command;
Light LED command; Emit beep command; 500 ms wait command;
Light LED command; Emit beep command; 200 ms wait command;
Light LED command; Emit beep command; 200 ms wait command;
Light LED command; Emit beep command; 200 ms wait command;
Light LED command; Emit beep command; 200 ms wait command;
Light LED command; Emit beep command; 200 ms wait command;
Light LED command; Emit beep command; 500 ms wait command;
Light LED command; Emit beep command; 500 ms wait command;
Light LED command; Emit beep command; 1000 ms wait command;

The user can visually and audibly detect the printer/scanner device lighting the LED(S) and beeping, thereby confirming which No. from the host computer the printer/scanner device the object of identification is.

Though the above action example only describes one pattern for the "execute individual identification process" command, a plurality of patterns may be provided in order to have a different "execute individual identification process" command for each printer/scanner device, according to the number of printer/scanner devices that are object of identification.

As described in detail above, according to the present embodiment, the user double-clicks on a bit-map representing the state of a certain printer/scanner device within the overhead-view USB connection status display area, double-clicked bit-map is detected, the status information of the printer/scanner device that is the object of identification is read in, whether or not the read status information indicates an available status for the device is checked, in the event that the read status information is an available status an "execute individual identification process" command is issued to the device at issue, and selection of the device is notified in an identifiable manner by emitting beeps and lighting LED(s), so that the user can easily confirm at which No. from the host computer the printer/scanner device to be used is connected, and where it is.

Now, though the above embodiment has been described with reference to a case wherein a plurality of printer/scanner devices are connected to an information processing apparatus (host computer 101), the present invention is by no means restricted to such an arrangement; rather, the present invention is applicable to arrangements for displaying the connection relation or order for all devices which can be serially connected to USB ports, such as keyboards, video tape recorders, mouses, floppy disk drives, speakers, and so forth.

Also, in the present embodiment, the same advantages may be obtained by the host computer 101 or system reading a recording medium storing control programs represented by software for achieving the present invention.

For example, unshown ROM is provided to serve as a recording medium used in the information processing apparatus, whereupon programs, to be used by the information processing apparatus to which multiple devices can be connected, are stored, and also code for a selecting step and code for a command-issuing step are stored therein as well. The code for these steps each has the following functions. That is, the code for the selecting step selects at least one of the multiple devices connected to the aforementioned information processing apparatus. The code for the command-issuing step outputs a command to the device(s) selected in the selecting step so as to identify the selection of the device(s).

Incidentally, other storage mediums which can be used here other than ROM include: floppy disks, hard disks, optical disks, CD-ROMs, CD-Rs, magnetic tape, non-volatile memory cards, and the like.

As described above, according to the embodiment of the present invention, at least one of a plurality of devices connected to an information processing apparatus is selected, and a command is output to the selected device(s) so as to identify the selection of the device(s), so that the user can easily confirm the actual connection state of the multiple devices connected to the information processing apparatus, and immediately grasp where the device to be used is located.

Also, above, according to the embodiment of the present invention, in the event that the plurality of devices connected to the information processing apparatus are devices having the functions of printing documents or reading documents, the user can easily confirm the actual connection state of the multiple devices connected to the information processing apparatus, and immediately grasp where the device to be used is located, for setting printing paper or documents to be read to the device to be used.

Incidentally, the internal format of the system setting information database (registry) changes according to the type of operating system. However, it is needless to say that, as long as the connection status information of the plurality of devices connected thereto is saved in the system setting information database (registry) in some format, the connection status of the devices can be judges and displayed on a screen according to a method the same as that of the present embodiment.

Further, according to the present embodiment, the registry information in the operating system is used to obtain information relating to connected devices and display the connection status, queries do not have to be made to the connected devices to obtain such information, thus enabling displaying of the connection status of the devices at high speeds.

What is claimed is:

1. An information processing apparatus that uses functions of an operating system to detect connection information of a device, judge whether or not the connection information of the device has already been registered, and, if it is judged that the detected connection information has not been registered, register the detected connection information to a registry, said apparatus comprising:

a judgment unit for judging whether a device is connected to said information processing apparatus or to another device based on detected connection information; and a display unit for displaying a connection status of the device, including whether the device is connected to said information processing apparatus or to another device, based on the connection information.

2. An information processing apparatus according to claim 1, wherein the device is a printer.

3. An information processing apparatus according to claim 1, wherein the operating system provides system setting information that includes a registry for registering connection information.

4. An information processing apparatus according to claim 1, wherein said display unit displays whether or not the device is available, in a recognizable manner.

5. An information processing apparatus according to claim 1, wherein said display unit displays a type of head mounted on the device, in a recognizable manner.

6. An information processing apparatus according to claim 1, further comprising a comparison unit for comparing a length of character strings of the connection information for the device, based on the detected connection information, wherein said display unit displays a connection status according to a comparison result from said comparison unit.

7. An information processing apparatus according to claim 6, wherein said display unit connects and displays each of a plurality of devices in ascending order of character string length, based on comparison results from said comparison unit.

8. An information processing apparatus according to claim 6, wherein said display unit connects and displays devices with a same character string length in a same connection order, based on comparison results from said comparison unit.

9. An information processing apparatus to which a plurality of devices are connected, said apparatus comprising:

obtaining means for obtaining connection information of the plurality of devices;

comparing means for comparing a length of character strings of the connection information for the plurality of devices, based on the connection information obtained by said obtaining means; and displaying means for displaying a connection status of the plurality of devices according to comparison results from said comparing means.

10. An information processing apparatus according to claim 9, wherein the plurality of devices comprises printers.

11. An information processing apparatus according to claim 9, wherein the connection information includes a registry.

12. An information processing apparatus according to claim 9, wherein said displaying means displays whether or not each device of the plurality of devices is available, in a recognizable manner.

13. An information processing apparatus according to claim 9, wherein said displaying means displays a type of head mounted on each device of the plurality of devices, in a recognizable manner.

14. An information processing apparatus according to claim 9, wherein said displaying means connects and displays each device of the plurality of devices in ascending order of character string length, based on the comparison results from said comparing means.

15. An information processing apparatus according to claim 9, wherein said displaying means connects and displays devices with a same character string length in a same connection order, based on the comparison results from said comparing means.

16. A connection status displaying method for an information processing apparatus that uses functions of an operating system to detect connection information of a device, judge whether or not the connection information of the device has already been registered, and, if it is judged that the detected connection information has not been registered, register the detected connection information to a registry, said method comprising:

a judgment step of judging whether a device is connected to the information processing apparatus or to another device based on detected connection information; and a display step of displaying a connection status of the device, including whether the device is connected to the information processing apparatus or to another device, based on the connection information.

17. A connection status displaying method according to claim 16, wherein the device is a printer.

18. A connection status displaying method according to claim 16, wherein the operating system provides system setting information that includes a registry for registering connection information.

19. A connection status displaying method according to claim 16, wherein said display step displays whether or not the device is available, in a recognizable manner.

20. A connection status displaying method according to claim 16, wherein said display step displays a type of head mounted on the device, in a recognizable manner.

21. A connection status displaying method according to claim 16, further comprising a comparison step of comparing a length of character strings of the connection information for the device, based on the detected connection information, wherein said display step displays a connection status according to a comparison result from said comparison step.

22. A connection status displaying method according to claim 21, wherein said display step connects and displays each device of a plurality of devices in ascending order of character string length, based on comparison results from said comparison step.

23. A connection status displaying method according to claim 21, wherein said display step connects and displays devices with a same character string length in a same connection order, based on comparison results from said comparison step.

24. A connection status displaying method for an information processing apparatus to which a plurality of devices are connected, said method comprising:

an obtaining step of obtaining connection information of the plurality of devices;

a comparing step of comparing a length of character strings of connection information for the plurality of devices, based on connection information obtained in said obtaining step; and a displaying step of displaying a connection status of the plurality of devices according to comparison results from said comparing step.

25. A connection status displaying method according to claim 24, wherein the plurality of devices comprises printers.

26. A connection status displaying method according to claim 24, wherein the connection information includes a registry.

27. A connection status displaying method according to claim 24, wherein said displaying step displays whether or not each device of the plurality of devices is available, in a recognizable manner.

28. A connection status displaying method according to claim 24, wherein said displaying step displays a type of head mounted on each device of the plurality of, in a recognizable manner.

29. A connection status displaying method according to claim 24, wherein said displaying step connects and displays each device of the plurality of devices in ascending order of character string length, based on the comparison results from said comparing step.

30. A connection status displaying method according to claim 24, wherein said displaying step connects and displays devices with a same character string length in a same connection order, based on the comparison results from said comparing step.

31. A storage medium storing a computer-readable program for implementing a connection status displaying method for an information processing apparatus that uses functions of an operating system to detect connection information of a device, judge whether or not the connection information of the device has already been registered, and, if it is judged that the detected connection information has not been registered, register the detected connection information to a registry, the program comprising:

code for a judgment step of judging whether a device is connected to the information processing apparatus or to another device based on detected connection information; and code for a display step of displaying a connection status of the device, including whether the device is connected to the information processing apparatus or to another device, based on the connection information.

32. A storage medium according to claim 31, wherein the device is a printer.

33. A storage medium according to claim 31, wherein the operating system provides system setting information that includes a registry for registering connection information.

34. A storage medium according to claim 31, wherein the display step displays whether or not the device is available, in a recognizable manner.

35. A storage medium according to claim 31, wherein the display step displays a type of head mounted on the device, in a recognizable manner.

36. A storage medium according to claim 31, wherein the program further comprises code for a comparison step of comparing a length of character strings of the connection information for the device, based on the detected connection information, wherein the display step displays a connection status according to a comparison result from the comparison step.

37. A storage medium according to claim 36, wherein the display step connects and displays each device of a plurality of devices in ascending order of character string length, based on comparison results from the comparison step.

38. A storage medium according to claim 36, wherein the display step connects and displays devices with a same character string length in a same connection order, based on comparison results from the comparison step.

39. A storage medium storing a computer-readable program for implementing a connection status displaying method for an information processing apparatus to which a plurality of devices are connected, the program comprising:

code for an obtaining step of obtaining connection information of the plurality of devices;

code for a comparing step of comparing a length of character strings of connection information for the plurality of devices, based on the connection information obtained in the obtaining step; and code for a displaying step of recognizing a connection status of the plurality of devices, based on comparison results from the comparing step.

40. A storage medium according to claim 39, wherein the plurality of devices comprises printers.

41. A storage medium according to claim 39, wherein the connection information includes a registry.

42. A storage medium according to claim 39, wherein the displaying step displays whether or not each device of the plurality of devices is available, in a recognizable manner.

43. A storage medium according to claim 39, wherein the displaying step displays a type of head mounted on each device of the plurality of devices, in a recognizable manner.

44. A storage medium according to claim 39, wherein the displaying step connects and displays each device of the plurality of devices in ascending order of character string length, based on comparison results from the comparing step.

45. A storage medium according to claim 39, wherein the displaying step connects and displays devices with a same character string length in a same connection order, based on comparison results from the comparing step.

* * * * *

UNITED STATES PATENT AND TRADEMARK OFFICE
CERTIFICATE OF CORRECTION

PATENT NO. : 6,473,811 B1
DATED : October 29, 2002
INVENTOR(S) : Takahiro Onsen

It is certified that error appears in the above-identified patent and that said Letters Patent is hereby corrected as shown below:

Drawings,
Sheet 5, Fig. 5, "MANAGMENT" should read -- MANAGEMENT --.

Column 18,
Lines 23 and 49, "unit" should read -- until --.

Column 19,
Line 1, "unit" should read -- until --.

Column 23,
Line 40, "same" should read -- same and --.

Column 26,
Line 37, "LED(S)" should read -- LED(s) --.

Column 27,
Line 50, "judges" should read -- judged --.

Column 30,
Line 5, "plurality of," should read -- plurality of devices, --.

Signed and Sealed this

Twenty-second Day of April, 2003

JAMES E. ROGAN
*Director of the United States Patent and Trademark Office*